(12) United States Patent
Kuwashiro et al.

(10) Patent No.: US 10,338,359 B2
(45) Date of Patent: Jul. 2, 2019

(54) ZOOM LENS AND IMAGE PICKUP APPARATUS USING THE SAME

(71) Applicant: CANON KABUSHIKI KAISHA, Tokyo (JP)

(72) Inventors: Shin Kuwashiro, Utsunomiya (JP); Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 15/480,633

(22) Filed: Apr. 6, 2017

(65) Prior Publication Data

US 2017/0293123 A1 Oct. 12, 2017

(30) Foreign Application Priority Data

Apr. 11, 2016 (JP) ................................. 2016-078727
Apr. 11, 2016 (JP) ................................. 2016-078728
Apr. 11, 2016 (JP) ................................. 2016-078729

(51) Int. Cl.
*G02B 15/14* (2006.01)
*G02B 15/16* (2006.01)
(Continued)

(52) U.S. Cl.
CPC ........... *G02B 15/16* (2013.01); *G02B 15/173* (2013.01); *G02B 5/005* (2013.01); *G02B 9/62* (2013.01);
(Continued)

(58) Field of Classification Search
CPC G02B 13/0045; G02B 27/0025; G02B 13/18; G02B 9/62; G02B 15/173;
(Continued)

(56) References Cited

U.S. PATENT DOCUMENTS 8,531,767 B2 * 9/2013 Li .................... G02B 15/173
359/557
8,743,469 B2 * 6/2014 Nakamura ........... G02B 15/173
359/676
(Continued)

FOREIGN PATENT DOCUMENTS

JP 2006-337745 A 12/2006
JP 2013-218291 A 10/2013
JP 2014-202806 A 10/2014

OTHER PUBLICATIONS

Partial Search Report issued in corresponding European application No. 17162694.8 dated Aug. 2, 2017.
(Continued)

*Primary Examiner* — Evelyn A Lester
(74) *Attorney, Agent, or Firm* — Carter, DeLuca & Farrell LLP

(57) ABSTRACT

Provided is a small zoom lens having a high zoom ratio and easily designed to achieve favorable optical properties in an entire zooming range. A zoom lens includes, in order from object side to image side, a positive first unit, a negative second unit, an aperture stop, and a rear group including multiple units. Intervals between the adjacent units are changed during zooming. In the rear group, a positive lens unit is arranged on the most image side, and a negative lens unit is on the object side of the positive lens unit. The aperture stop not moving for zooming, but the second unit and the negative lens unit moving during zooming. Focal lengths of the second unit and the positive and negative lens units, and movement amounts of the second and negative lens units, respectively, during zooming from wide angle end to telephoto end are appropriately set.

29 Claims, 11 Drawing Sheets

(51) Int. Cl.
*G02B 15/173* (2006.01)
*G02B 13/00* (2006.01)
*G02B 27/00* (2006.01)
*G02B 15/20* (2006.01)
*G02B 13/18* (2006.01)
*G02B 5/00* (2006.01)
*G02B 9/62* (2006.01)

(52) U.S. Cl.
CPC ........ *G02B 13/009* (2013.01); *G02B 13/0045* (2013.01); *G02B 13/18* (2013.01); *G02B 15/14* (2013.01); *G02B 15/20* (2013.01); *G02B 27/0025* (2013.01)

(58) Field of Classification Search
CPC ...... G02B 5/005; G02B 15/20; G02B 13/009; G02B 15/14; G02B 15/16
USPC ......... 359/683–687, 713–716, 740, 758, 785
See application file for complete search history.

(56) References Cited

U.S. PATENT DOCUMENTS

| | | | |
|---|---|---|---|
| 9,116,336 B2* | 8/2015 | Takemoto | G02B 15/173 |
| 9,264,638 B2 | 2/2016 | Nakamura et al. | |
| 9,268,120 B2 | 2/2016 | Shimomura et al. | |
| 9,310,592 B2 | 4/2016 | Wakazono et al. | |
| 2009/0201591 A1 | 8/2009 | Yamasaki | |
| 2011/0002045 A1 | 1/2011 | Li | |
| 2011/0279898 A1* | 11/2011 | Takemoto | G02B 15/173 359/557 |
| 2012/0147253 A1 | 6/2012 | Anzawa et al. | |
| 2013/0010174 A1* | 1/2013 | Shinohara | G02B 13/18 359/683 |
| 2013/0250435 A1* | 9/2013 | Hagiwara | G02B 15/173 359/684 |
| 2014/0118603 A1 | 5/2014 | Saito | |
| 2014/0293441 A1 | 10/2014 | Inomoto et al. | |
| 2014/0320977 A1* | 10/2014 | Yakita | G02B 15/177 359/686 |
| 2015/0097995 A1* | 4/2015 | Wada | H04N 5/23296 359/683 |
| 2015/0124126 A1* | 5/2015 | Yamano | H04N 5/23296 359/687 |
| 2015/0260968 A1* | 9/2015 | Ohashi | G02B 7/028 359/684 |
| 2015/0316755 A1* | 11/2015 | Takemoto | G02B 15/16 359/683 |
| 2015/0316756 A1* | 11/2015 | Sanjo | G02B 27/0025 359/684 |
| 2015/0362710 A1* | 12/2015 | Kikuchi | G02B 15/16 359/684 |
| 2016/0062092 A1* | 3/2016 | Sakamoto | G02B 27/0025 359/683 |
| 2016/0356997 A1 | 12/2016 | Inomoto | |
| 2017/0139190 A1 | 5/2017 | Kuwashiro | |

OTHER PUBLICATIONS

Extended European Search Report dated Jan. 2, 2018 in corresponding European Patent Application No. 17162694.8, 16 pages.

* cited by examiner

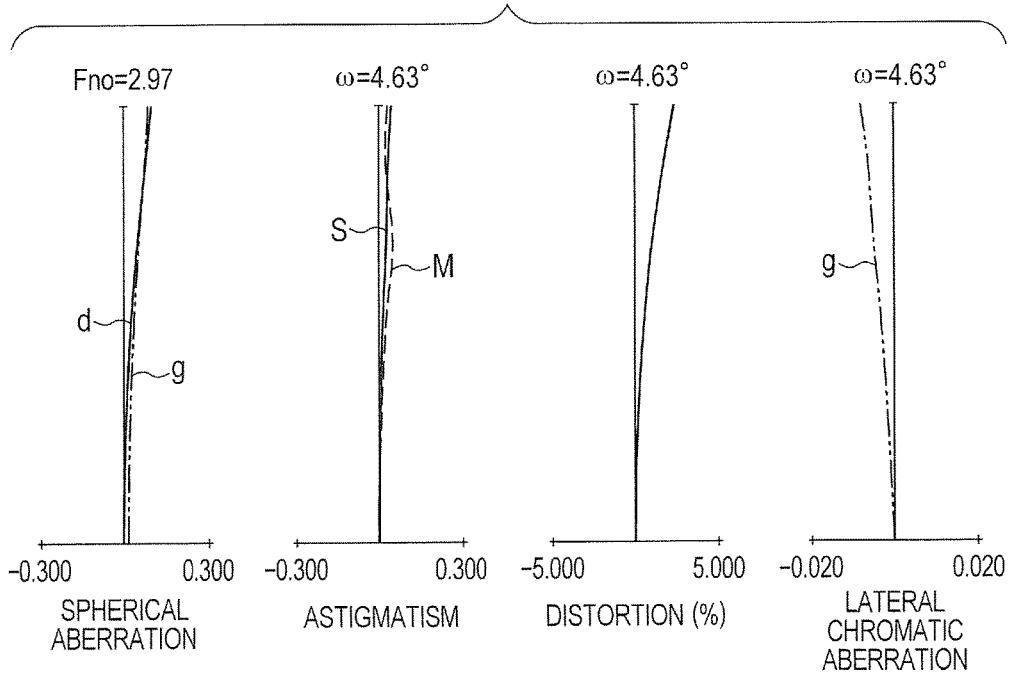
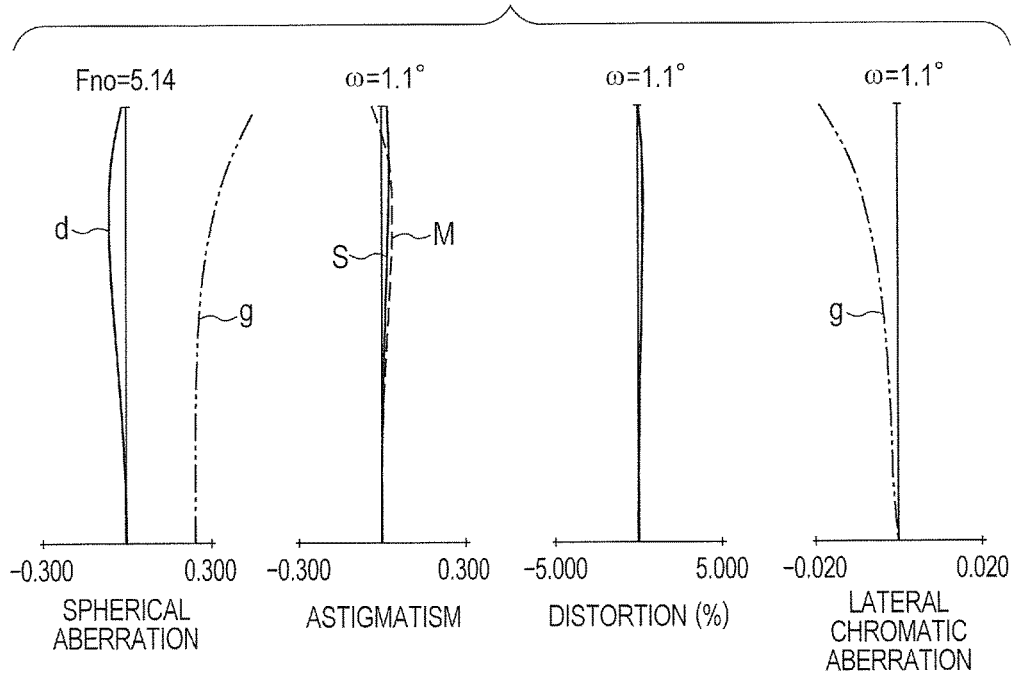

ZOOM LENS AND IMAGE PICKUP APPARATUS USING THE SAME

BACKGROUND OF THE INVENTION

Field of the Invention

The present invention relates to a zoom lens and an image pickup apparatus using the same, and is preferred in particular as an image pickup optical system for use in image pickup apparatuses such as a digital still camera, a video camera, a monitoring camera, and a broadcast camera.

Description of the Related Art

In recent years, an image pickup optical system used in an image pickup apparatus has been required to be a zoom lens being small in total size and achieving a wide angle of view and a high zoom ratio.

As a zoom lens meeting these requirements, there has been known a positive-lead type zoom lens in which a lens unit having a positive refractive power is arranged closest to an object. The positive-lead type zoom lens is characterized in that the zoom lens achieves a high zoom ratio and is easily designed to reduce a variation in the F-number for zooming. As a positive-lead type zoom lens, there has been known a zoom lens in which the first lens unit located closest to an object does not move for zooming.

Japanese Patent Application Laid-Open No. 2013-218291 discloses a zoom lens including six lens units, namely, first to sixth lens units having positive, negative, positive, positive, negative, and positive refractive powers, respectively, arranged in this order from an object side to an image side. For zooming of this zoom lens, the first lens unit, the third lens unit, and the sixth lens unit do not move, but the second lens unit, the fourth lens unit, and the fifth lens unit move.

Japanese Patent Application Laid-Open No. 2006-337745 discloses a zoom lens including first to fifth lens units having positive, negative, positive, negative, and positive refractive powers, respectively. For zooming of this zoom lens, the first lens unit and the fifth lens unit do not move, but the second to fourth lens units move.

Employing a zooming method involving moving the first lens unit for zooming, the aforementioned positive-lead type zoom lens can be easily designed to achieve a high zoom ratio. However, in the case of a monitoring camera, for example, if the first lens unit moves for zooming, problems may arise in anti-shock, water proof, and dust proof properties. For this reason, the monitoring camera is strongly required to be a zoom lens which achieves a high zoom ratio without moving the first lens unit for zooming.

SUMMARY OF THE INVENTION

The present invention has an objective to provide a zoom lens easily designed to be small and to achieve a high zoom ratio and favorable optical properties in an entire zooming range, and to provide an image pickup apparatus including the same.

A zoom lens of the present invention includes, in order from an object side to an image side, a first lens unit having a positive refractive power, a second lens unit having a negative refractive power, an aperture stop, and a rear group including a plurality of lens units, and intervals between the adjacent lens units are changed during zooming. In the rear group, a lens unit Lp having a positive refractive power is arranged closest to an image plane, and a lens unit Ln having a negative refractive power is arranged on the object side of and adjacent to the lens unit Lp. The aperture stop does not move for zooming, but the second lens unit and the lens unit Ln move during zooming. The first lens unit consists of, in order from the object side to the image side, a negative lens, a positive lens, a positive lens, and a positive lens. The zoom lens satisfies the following conditional expressions:

$-6.00 < f2/|M2| < -0.02$; and $-2.00 < fn/|Mn| < -0.02$, where f2 denotes a focal length of the second lens unit, fn denotes a focal length of the lens unit Ln, M2 denotes a movement amount of second lens unit during zooming from a wide angle end to a telephoto end, and Mn denotes a movement amount of the lens unit Ln during zooming from the wide angle end to the telephoto end.

Further features of the present invention will become apparent from the following description of exemplary embodiments with reference to the attached drawings.

BRIEF DESCRIPTION OF THE DRAWINGS

FIG. 4B is an aberration diagram of the zoom lens at the middle zooming position according to Embodiment 2.

FIG. 4C is an aberration diagram of the zoom lens at the telephoto end according to Embodiment 2.

DESCRIPTION OF THE EMBODIMENTS

Preferred embodiments of the present invention will now be described in detail in accordance with the accompanying drawings. A zoom lens of the present invention comprises, in order from an object side to an image side, a first lens unit having a positive refractive power, a second lens unit having a negative refractive power, an aperture stop, and a rear group including a plurality of lens units, wherein intervals between the adjacent lens units are changed during zooming. In the rear group, a lens unit Lp having a positive refractive power is arranged closest to an image plane and a lens unit Ln having a negative refractive power is arranged on the object side of and adjacent to the lens unit Lp. The aperture stop does not move for zooming, but the second lens unit and the lens unit Ln move during zooming.

Figure 1:
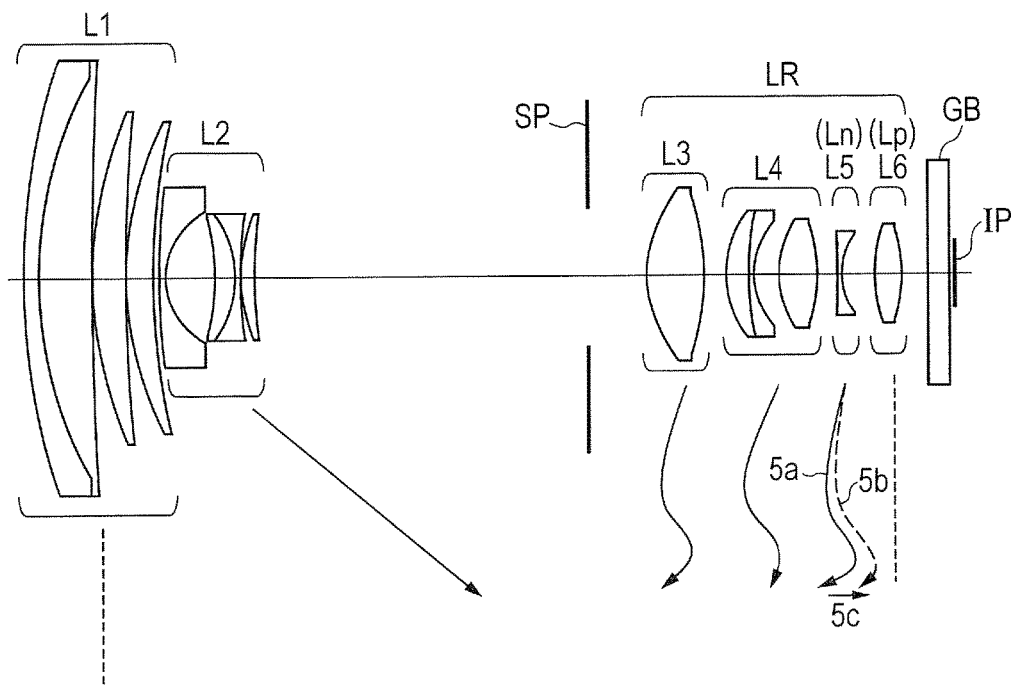
FIG. 1 is a lens cross-sectional view of a zoom lens at a wide angle end according to Embodiment 1.
Figure 2A:
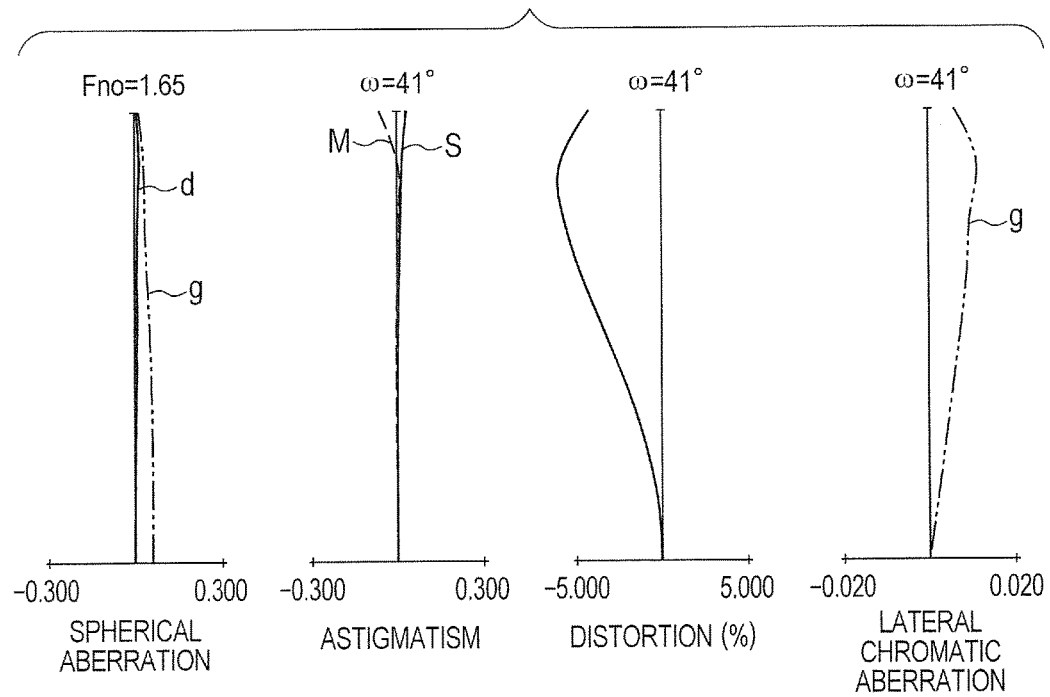
FIG. 2A is an aberration diagram of the zoom lens at the wide angle end according to Embodiment 1.
Figure 2B:
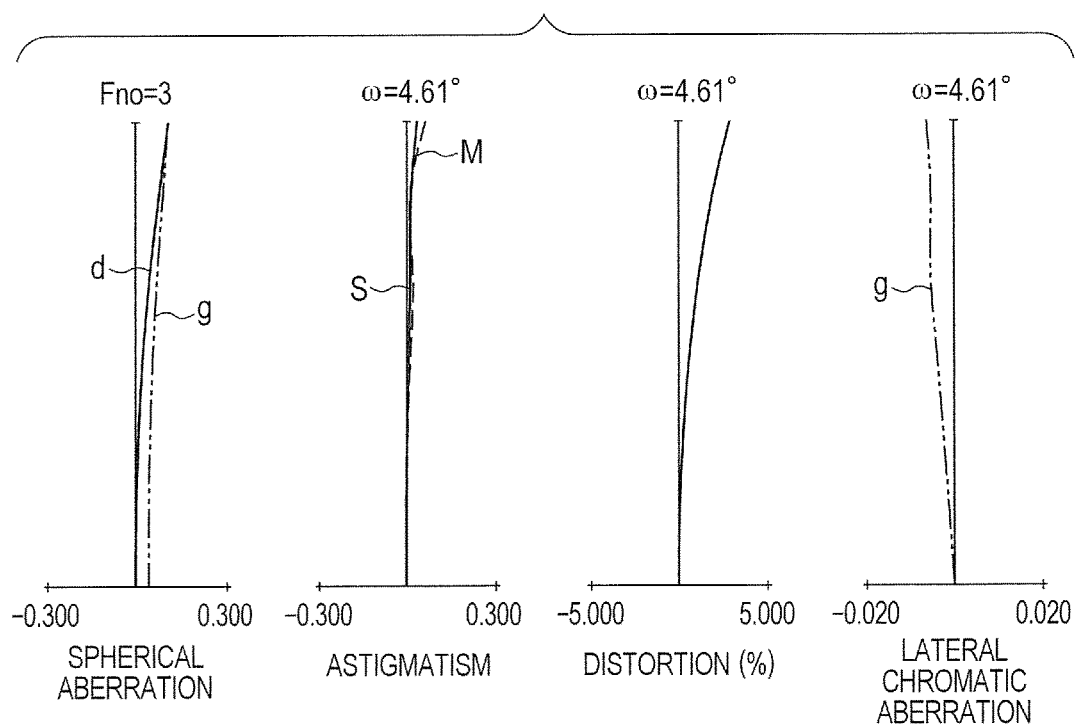
FIG. 2B is an aberration diagram of the zoom lens at a middle zooming position according to Embodiment 1.
Figure 2C:
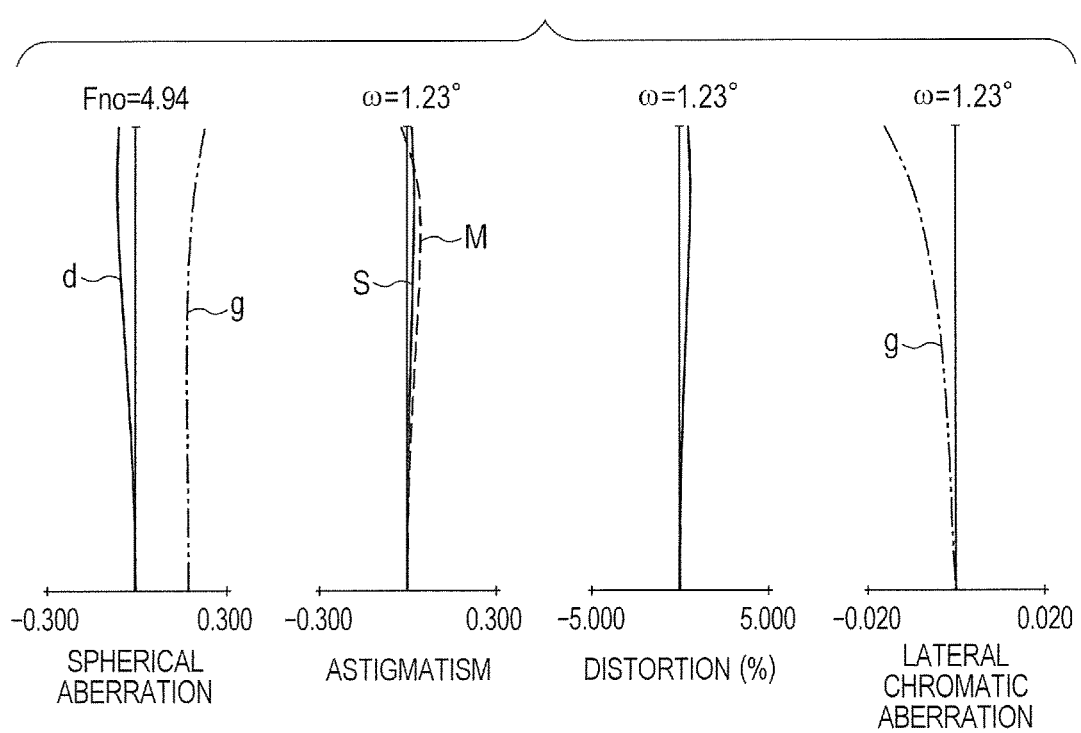
FIG. 2C is an aberration diagram of the zoom lens at a telephoto end according to Embodiment 1.

FIG. 1 is a lens cross-sectional view of a zoom lens at a wide angle end (short focal length end) according to Embodiment 1 in the present invention. FIGS. 2A, 2B, and 2C are aberration diagrams of the zoom lens of Embodiment 1 at the wide angle end, a middle zooming position, and a telephoto end (long focal length end). Embodiment 1 is a zoom lens with a zoom ratio of 39.08 and an F-number of 1.65 to 4.94.

Figure 3:
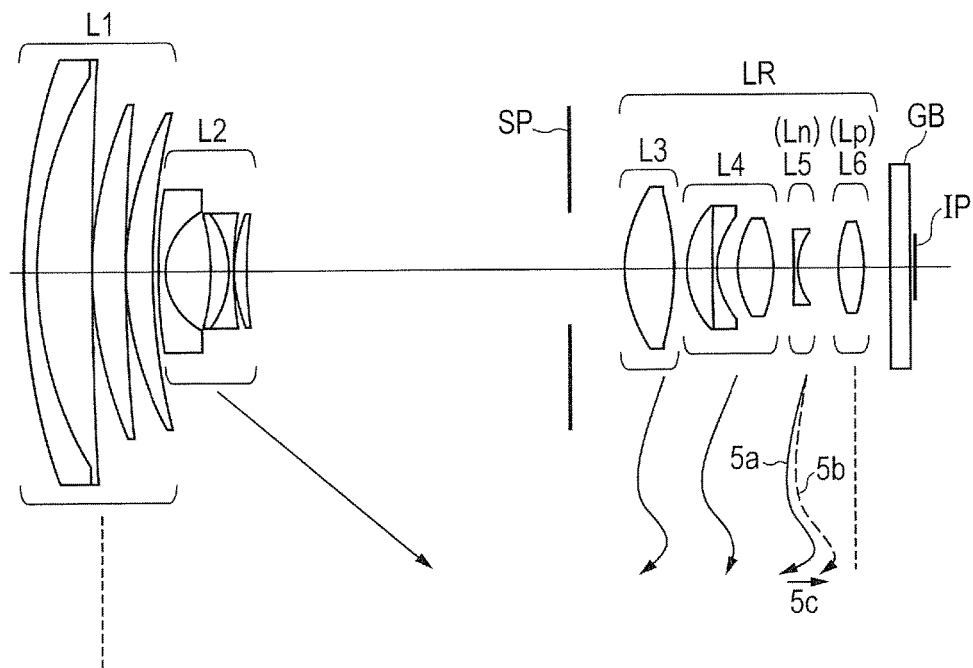
FIG. 3 is a lens cross-sectional view of a zoom lens at the wide angle end according to Embodiment 2.
Figure 4A:
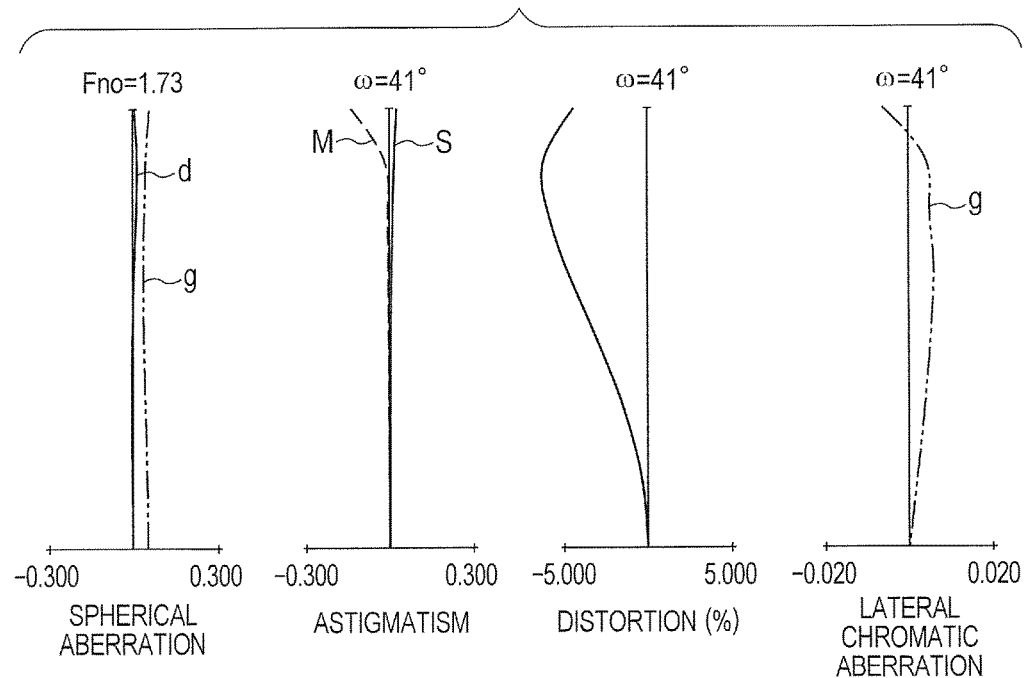
FIG. 4A is an aberration diagram of the zoom lens at the wide angle end according to Embodiment 2.

FIG. 3 is a lens cross-sectional view of a zoom lens at the wide angle end according to Embodiment 2 in the present invention. FIGS. 4A, 4B, and 4C are aberration diagrams of the zoom lens of Embodiment 2 at the wide angle end, the middle zooming position, and the telephoto end. Embodiment 2 is a zoom lens with a zoom ratio of 43.95 and an F-number of 1.73 to 5.14.

Figure 5:
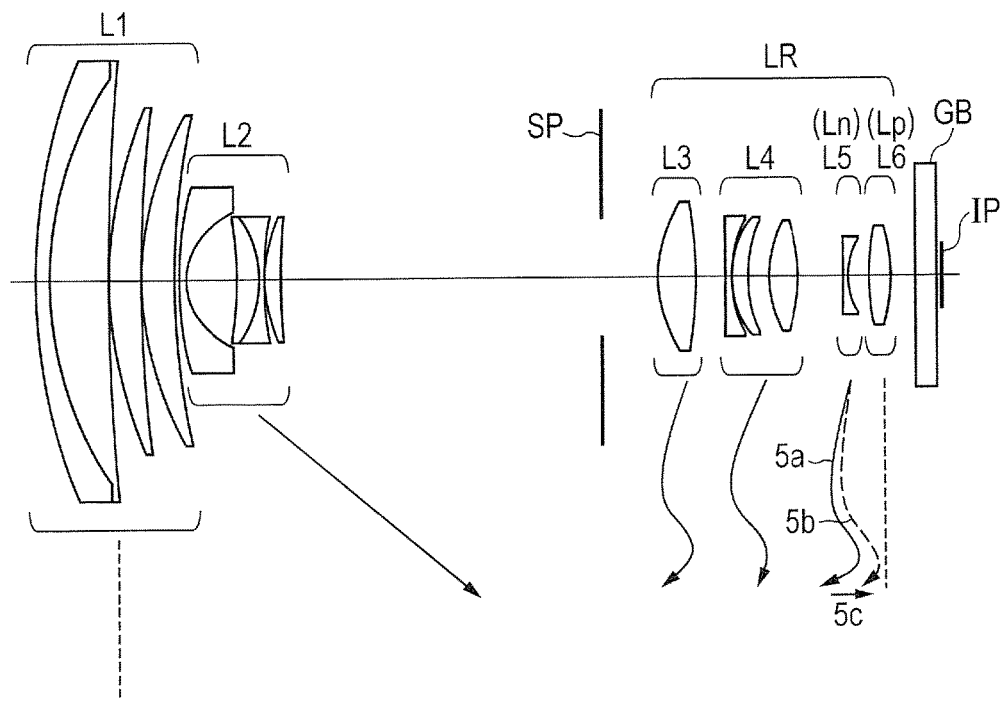
FIG. 5 is a lens cross-sectional view of a zoom lens at the wide angle end according to Embodiment 3.
Figure 6A:
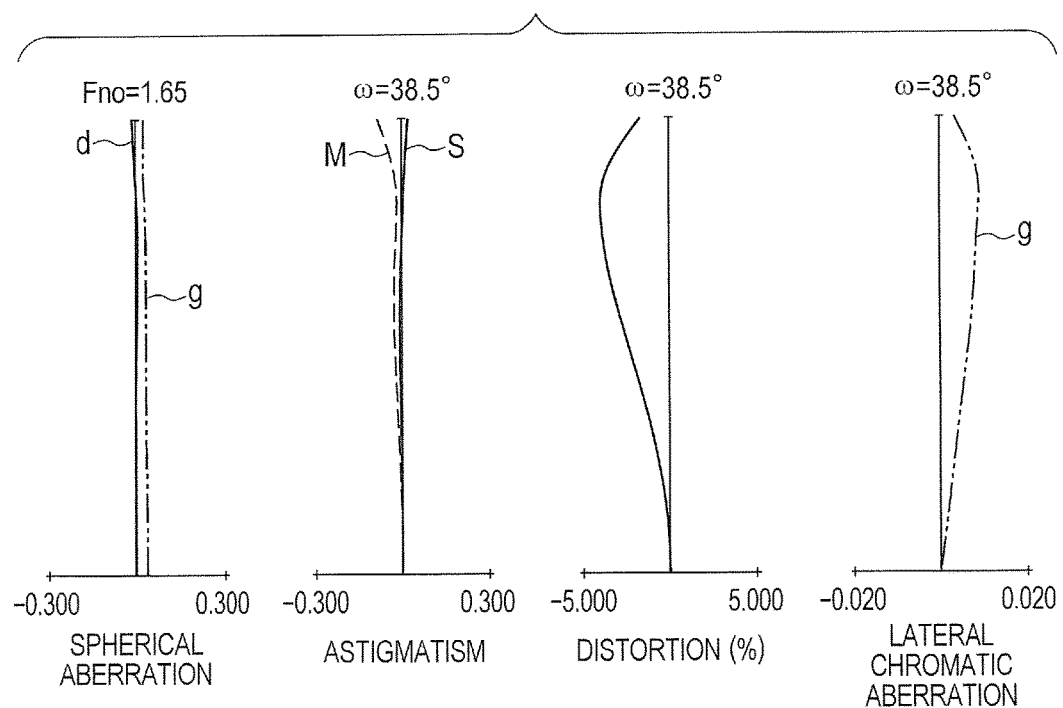
FIG. 6A is an aberration diagram of the zoom lens at the wide angle end according to Embodiment 3.
Figure 6B:
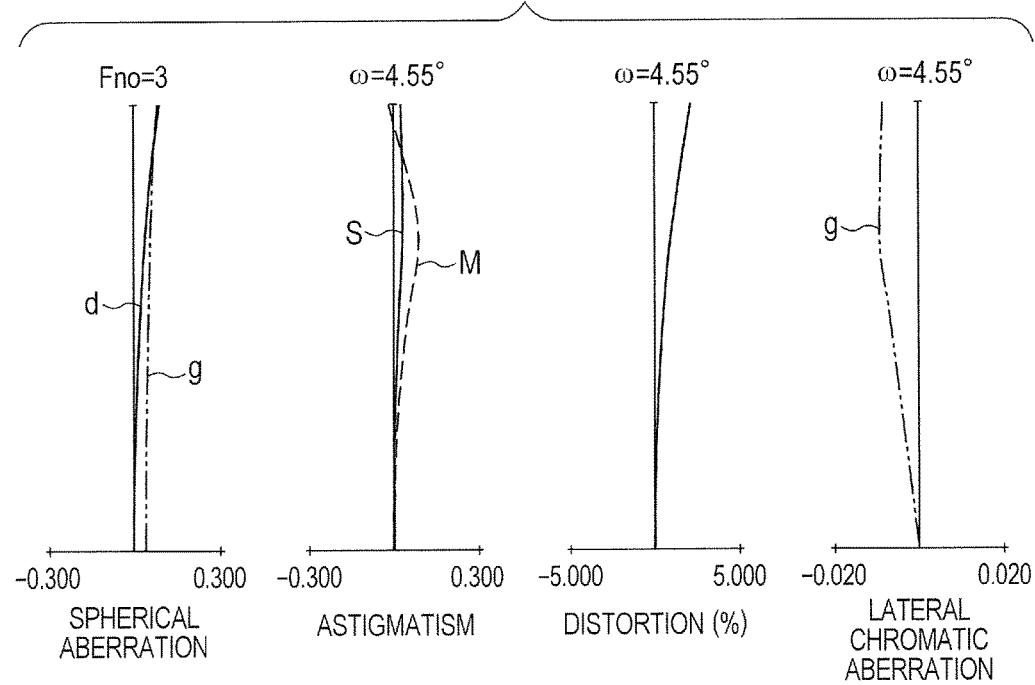
FIG. 6B is an aberration diagram of the zoom lens at the middle zooming position according to Embodiment 3.
Figure 6C:
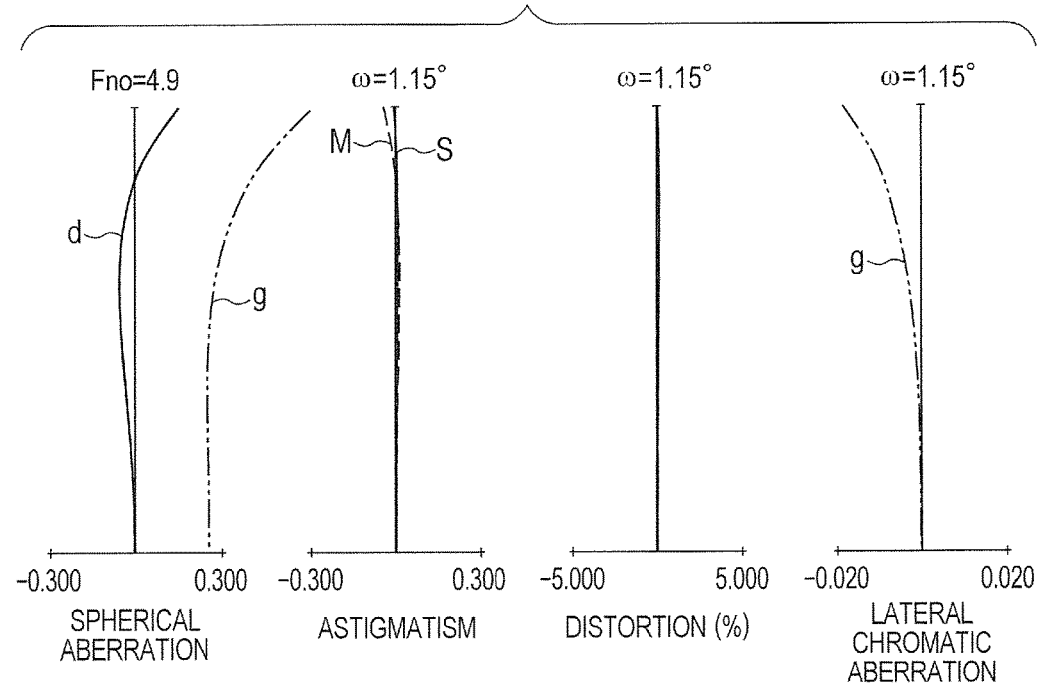
FIG. 6C is an aberration diagram of the zoom lens at the telephoto end according to Embodiment 3.

FIG. 5 is a lens cross-sectional view of a zoom lens at the wide angle end according to Embodiment 3 in the present invention. FIGS. 6A, 6B, and 6C are aberration diagrams of the zoom lens of Embodiment 3 at the wide angle end, the middle zooming position, and the telephoto end. Embodiment 3 is a zoom lens with a zoom ratio of 39.10 and an F-number of 1.65 to 4.90.

Figure 7:
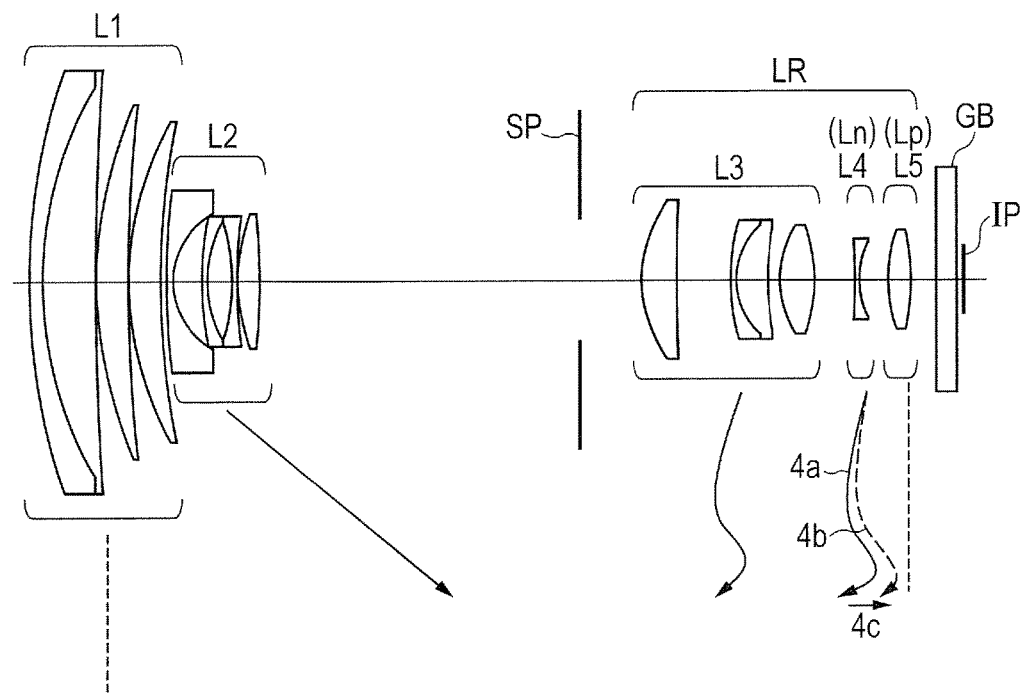
FIG. 7 is a lens cross-sectional view of a zoom lens at the wide angle end according to Embodiment 4.
Figure 8A:
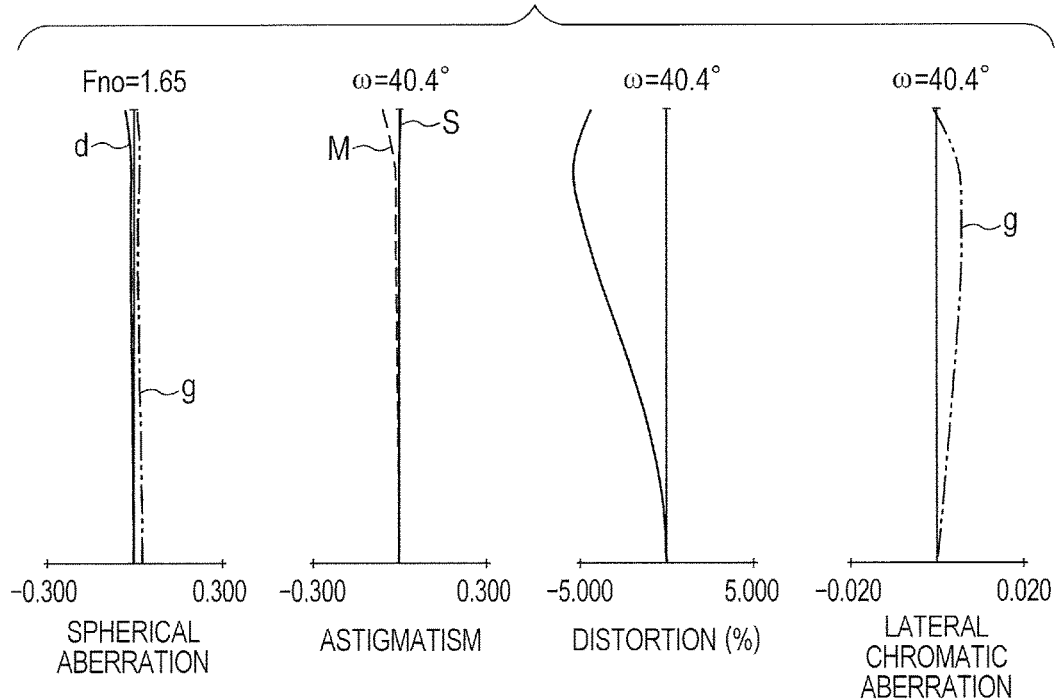
FIG. 8A is an aberration diagram of the zoom lens at the wide angle end according to Embodiment 4.
Figure 8B:
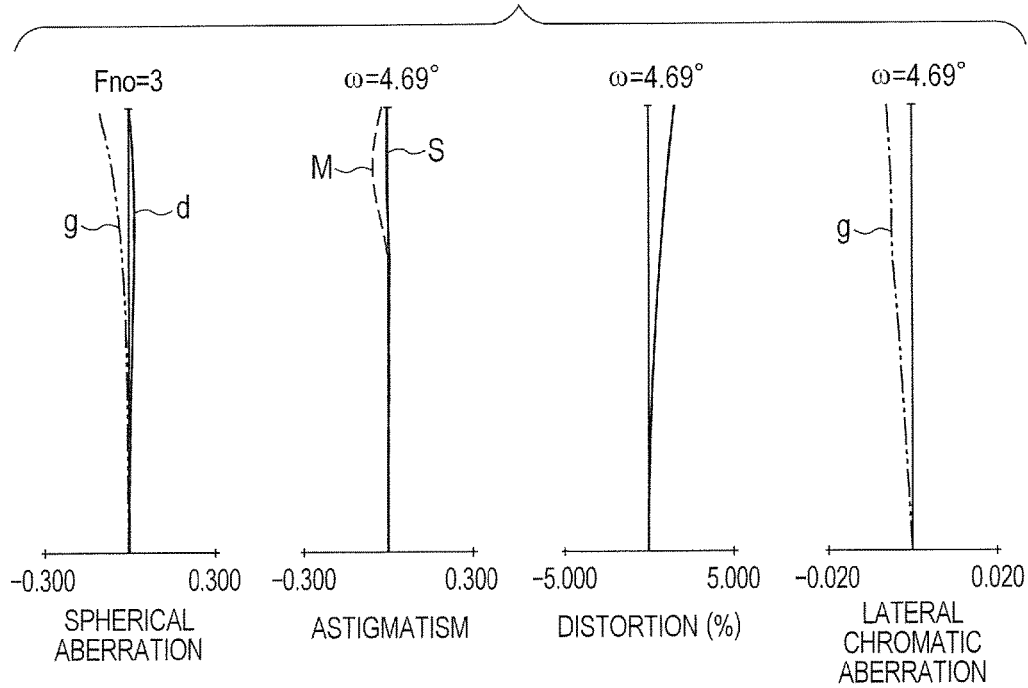
FIG. 8B is an aberration diagram of the zoom lens at the middle zooming position according to Embodiment 4.
Figure 8C:
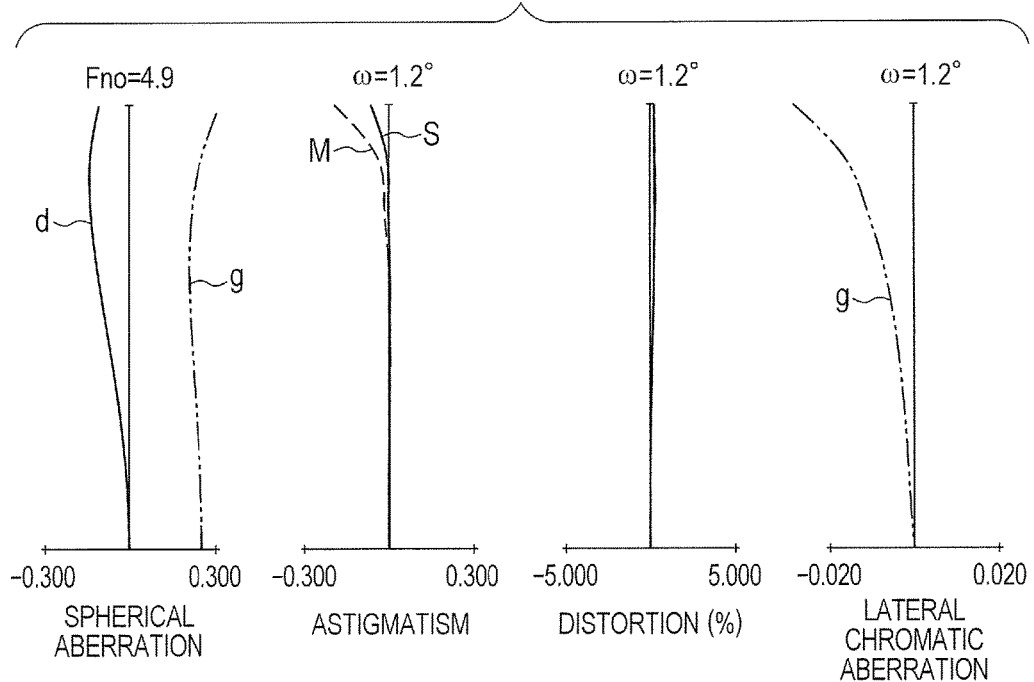
FIG. 8C is an aberration diagram of the zoom lens at the telephoto end according to Embodiment 4.

FIG. 7 is a lens cross-sectional view of a zoom lens at the wide angle end according to Embodiment 4 in the present invention. FIGS. 8A, 8B, and 8C are aberration diagrams of the zoom lens of Embodiment 4 at the wide angle end, the middle zooming position, and the telephoto end. Embodiment 4 is a zoom lens with a zoom ratio of 39.10 and an F-number of 1.65 to 4.90.

Figure 9:
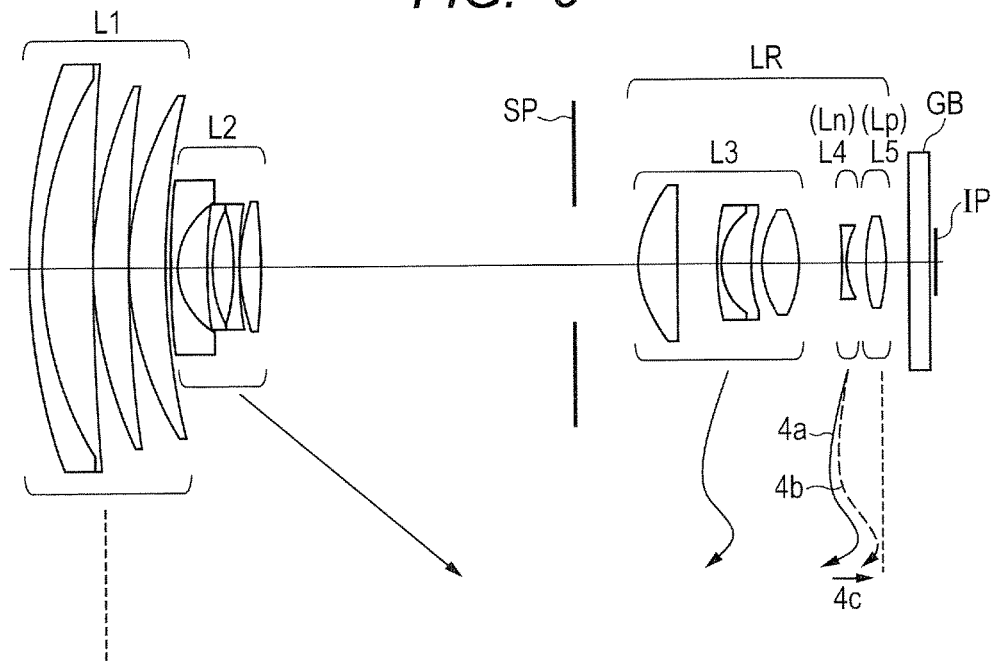
FIG. 9 is a lens cross-sectional view of a zoom lens at the wide angle end according to Embodiment 5.
Figure 10A:
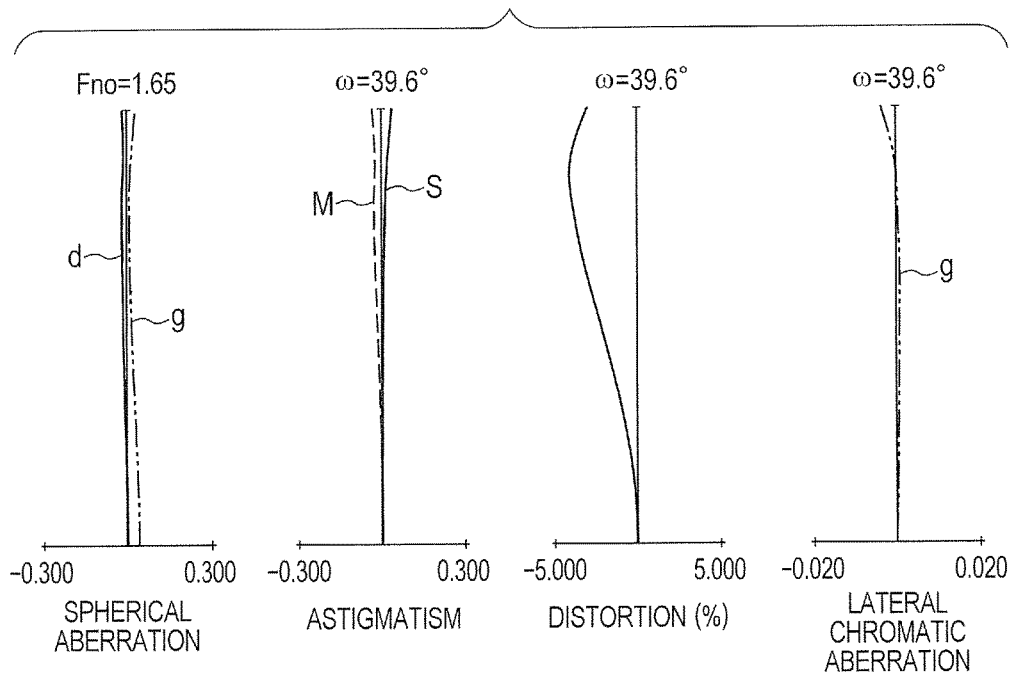
FIG. 10A is an aberration diagram of the zoom lens at the wide angle end according to Embodiment 5.
Figure 10B:
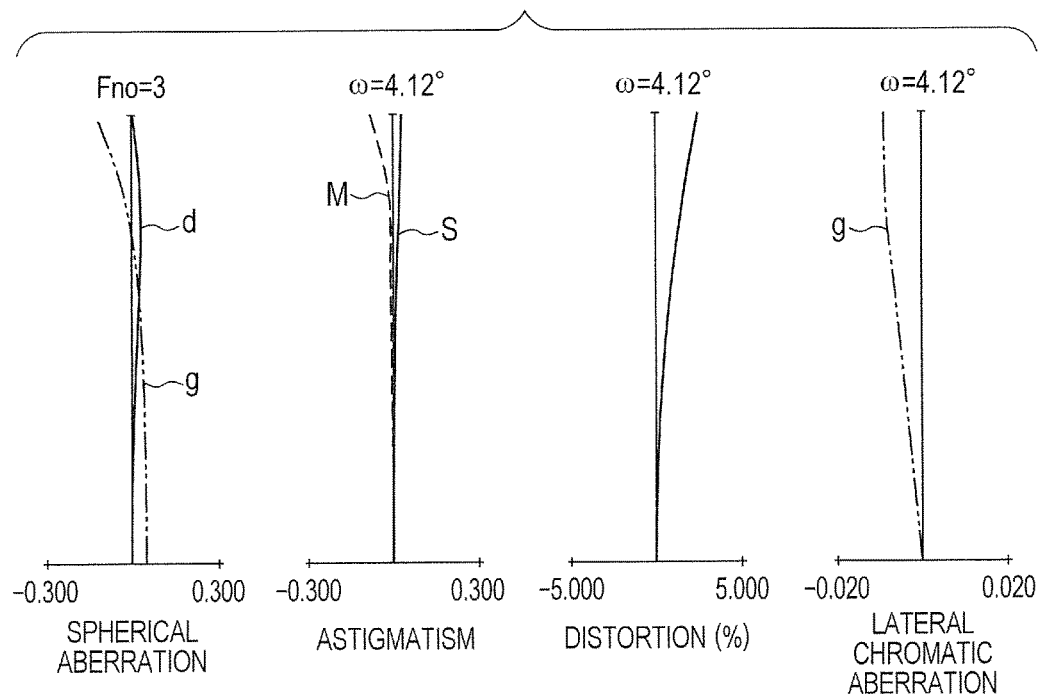
FIG. 10B is an aberration diagram of the zoom lens at the middle zooming position according to Embodiment 5.
Figure 10C:
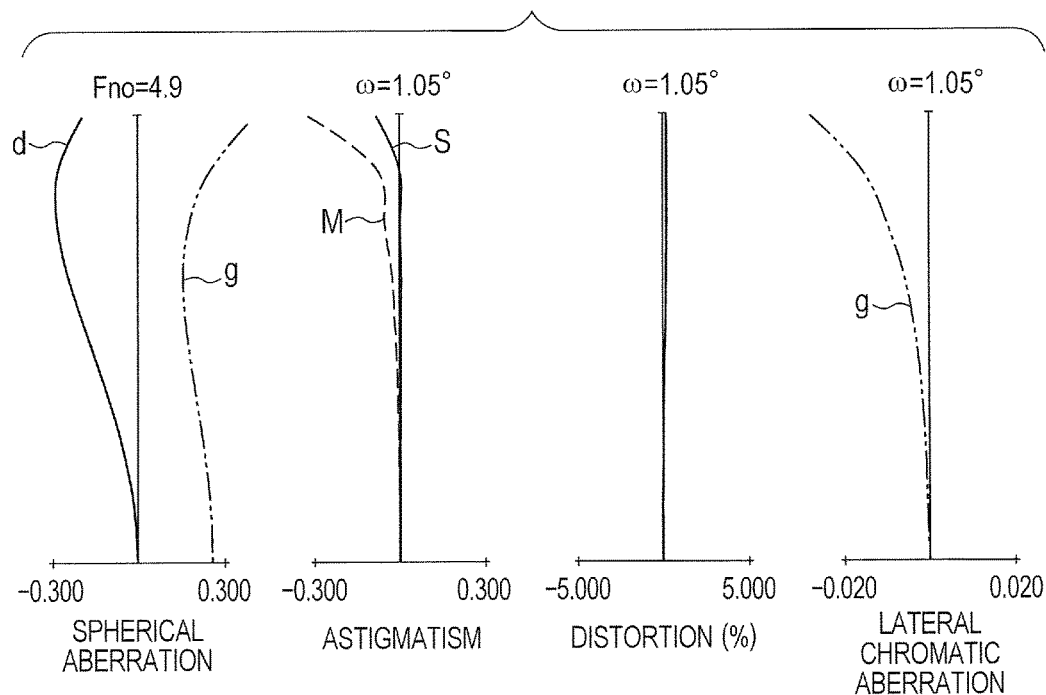
FIG. 10C is an aberration diagram of the zoom lens at the telephoto end according to Embodiment 5.
Figure 11:
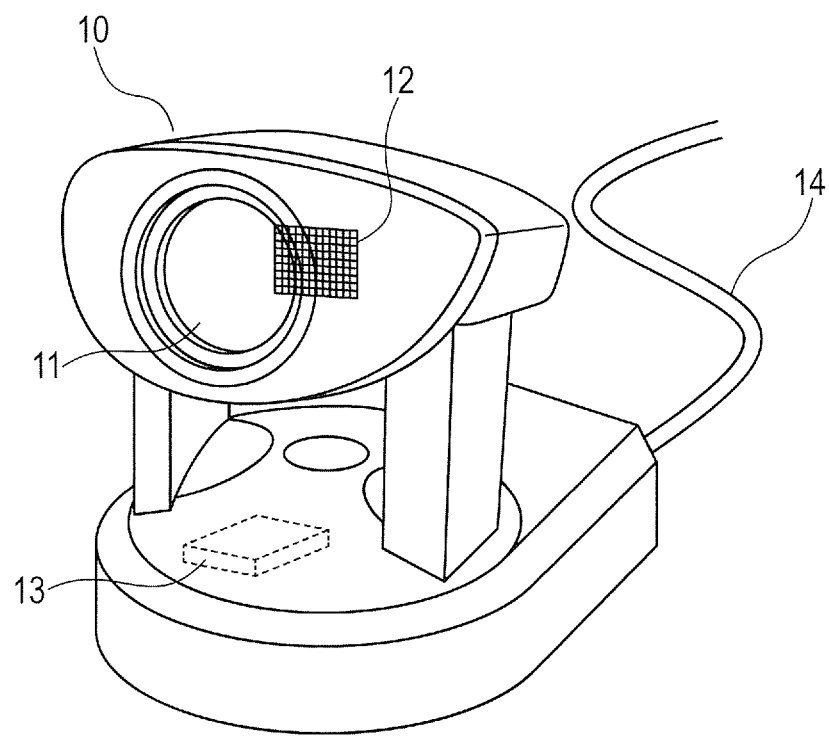
FIG. 11 is a schematic diagram of essential parts of an image pickup apparatus of the present invention.

FIG. 9 is a lens cross-sectional view of a zoom lens at the wide angle end according to Embodiment 5 in the present invention. FIGS. 10A, 10B, and 10C are aberration diagrams of the zoom lens of Embodiment 5 at the wide angle end, the middle zooming position, and the telephoto end. Embodiment 5 is a zoom lens with a zoom ratio of 43.99 and an F-number of 1.65 to 4.90. FIG. 11 is a schematic diagram of essential parts of an image pickup apparatus of the present invention.

The zoom lenses of Embodiments 1 to 5 are for use in image pickup apparatuses such as video cameras, digital cameras, television cameras, monitoring cameras, and silver halide film cameras. In the lens cross-sectional views, the left side is a subject side (object side) (front side), and the right side is an image side (rear side). In the lens cross-sectional views, i indicates an order of the lens units from the object side, and Li is an i-th lens unit. LR indicates a rear group including a plurality of lens units.

In the lens cross-sectional views, SP is the aperture stop, which is arranged on the object side of the third lens unit L3. In the lens cross-sectional views, GB is an optical element equivalent to an optical filter, a face plate, a crystal low-pass filter, an infrared cut filter, or the like. IP is an image plane. When the zoom lens is used as an image pickup optical system in a video camera or a digital still camera, a solid state image pickup element (photoelectric conversion element) such as a CCD sensor or a CMOS sensor is placed on the image plane. When the zoom lens is used in a silver halide film camera, a photosensitive surface equivalent to a film plane is placed on the image plane.

Arrows indicate movement loci of the respective lens units during zooming (magnification change) from the wide angle end to the telephoto end, and a movement direction of the lens unit for focusing. In the aberration diagrams, a spherical aberration is presented by a solid line d representing a d-line (wavelength of 587.6 nm) and a two-dot chain line g representing a g-line (wavelength of 435.8 nm). An astigmatism diagram is presented by a dotted line M representing a meridional image plane of the d-line, and a solid line S representing a sagittal image plane of the d-line. A lateral chromatic aberration is represented by the g-line relative to the d-line. Here, ω indicates a half angle of view (a half value of an angle of view for imaging pickup) (degree), and Fno indicates an F-number.

In the lens cross-sectional views of Embodiments 1 to 3, L1 is a first lens unit having a positive refractive power, L2 is a second lens unit having a negative refractive power, and LR is a rear group. The rear group LR includes a third lens unit L3 having a positive refractive power, a fourth lens unit L4 having a positive refractive power, a fifth lens unit L5 having a negative refractive power, and a sixth lens unit L6 having a positive refractive power. Embodiments 1 to 3 are six-unit zoom lenses.

In Embodiments 1 to 3, the first lens unit L1 and the sixth lens unit L6 do not move for zooming. During zooming from the wide angle end to the telephoto end, the second lens unit L2 moves to the image side as illustrated by the associated arrow. The third lens unit L3, the fourth lens unit L4, and the fifth lens unit L5 move non-linearly along respectively different loci, i.e., they once move to the object side, then move to the image side, and again move to the object side. The aperture stop SP does not move.

The fifth lens unit L5 is moved during focusing and correcting an image plane variation attributed to zooming. A solid curve line 5a and a dotted curve line 5b for the fifth lens unit L5 indicate movement loci for correcting image plane variations attributed to zooming while focusing on an infinite distance object and a short distance object, respectively. In addition, focusing from an infinite distance object to a short distance object is performed by retracting the fifth lens unit L5 rearward (to the image side) as illustrated by an arrow 5c. Here, a lens unit used for focusing is not limited to the fifth lens unit L5, but instead may be another lens unit alone, or two or more other lens units.

In the lens cross-sectional views of Embodiments 4 and 5, L1 is a first lens unit having a positive refractive power, L2 is a second lens unit having a negative refractive power, and LR is a rear group. The rear group LR includes a third lens unit L3 having a positive refractive power, a fourth lens unit L4 having a negative refractive power, and a fifth lens unit L5 having a positive refractive power. Embodiments 4 and 5 are five-unit zoom lenses. In Embodiments 4 and 5, the first lens unit L1 and the fifth lens unit L5 do not move for zooming.

In Embodiments 4 and 5, during zooming from the wide angle end to the telephoto end, the second lens unit L2 moves to the image side as illustrated by the associated arrow. The third lens unit L3 and the fourth lens unit L4 move non-linearly along respectively different loci, i.e., they once move to the object side, then move to the image side, and again move to the object side. The aperture stop SP does not move. In Embodiments 4 and 5, the fourth lens unit L4 is moved during focusing and correcting an image plane variation attributed to zooming.

A solid curve line 4a and a dotted curve line 4b for the fourth lens unit L4 indicate movement loci for correcting image plane variations attributed to zooming during focusing on an infinite distance object and a short distance object, respectively. In addition, focusing from an infinite distance object to a short distance object is performed by retracting the fourth lens unit L4 rearward (to the image side) as illustrated by an arrow 4c. Here, a lens unit used for focusing is not limited to the fourth lens unit L4, but may be another lens unit alone, or two or more other lens units.

In Embodiments 1 to 5, an aperture diameter of the aperture stop SP may be constant during zooming, or may be changed depending on zooming. If the aperture diameter of the aperture stop SP is changed during zooming, more favorable optical properties can be obtained easily because the aperture stop SP can cut off-axial marginal rays and thus reduce coma flare.

The zoom lens of the present invention has an objective to provide a small zoom lens having a wide angle of view and achieving favorable optical properties in an entire zooming range.

In the zoom lens of the present invention, the first lens unit L1 having the positive refractive power, the second lens unit L2 having the negative refractive power, the aperture stop SP, and the rear group LR including the plurality of lens units are arranged in that order from the object side to the image side. Then, in the rear group LR, the lens unit Lp having the positive refractive power is arranged closest to the image plane, and the lens unit Ln having the negative refractive power is arranged on the object side of the lens unit Lp.

Provided that: f2 denotes a focal length of the second lens unit L2; fn denotes a focal length of the lens unit Ln; M2 denotes a movement amount of the second lens unit L2 during zooming from the wide angle end to the telephoto end; and Mn denotes a movement amount of the lens unit Ln during zooming from the wide angle end to the telephoto end, the zoom lens satisfies the following conditional expressions:

$$-6.00 < f2/|M2| < -0.02 \quad (1); \text{ and}$$

$$-2.00 < fn/|Mn| < -0.02 \quad (2).$$

Here, the movement amount of a lens unit during zooming from the wide angle end to the telephoto end is defined as a difference between a position of the lens unit at the wide angle end on an optical axis and a position of the lens unit at the telephoto end on the optical axis. A sign of the movement amount is plus in the case where the lens unit is closer to the image plane at the telephoto end than at the wide angle end, and is minus in the case where the lens unit is closer to the object at the telephoto end than at the wide angle end.

In the zoom lens of the present invention, the rear group LR is provided with the foregoing lens configuration, so that the lens unit Ln having the negative refractive power has relatively high position sensitivity (focus sensitivity). Moreover, this configuration makes it easier to shorten a stroke (movement amount) for correcting the image plane variation during zooming and a stroke for focusing.

Further, shortening the length between the aperture stop SP and the image plane makes it easier to allow the second lens unit L2, as a primary magnification lens unit which can produce a high zooming effect, to perform a long stroke and thereby facilitates an enhancement of the zoom ratio. In addition, satisfying the conditional expressions (1) and (2) enables the realization of a zoom lens that has a high zoom ratio, is small in total size, and has favorable optical properties in the entire zooming range.

The conditional expression (1) specifies a ratio of the focal length of the second lens unit L2 to the movement amount of the second lens unit L2 during zooming. By satisfying the conditional expression (1), the zoom lens can be easily designed to achieve a high zoom ratio with a small lens system. If the negative focal length of the second lens unit L2 is so long (if the absolute value of the negative focal length is so large) as to cause the ratio to fall below the lower limit value of the conditional expression (1), a long stroke is necessary to achieve a high zoom ratio. As a result, the total length of the zoom lens is inevitably long.

On the other hand, if the focal length of the second lens unit L2 is so short (if the absolute value of the negative focal length is so small) as to cause the ratio to exceed the upper limit value of the conditional expression (1), a curvature-of-field variation and a lateral chromatic aberration variation due to zooming become too large.

The conditional expression (2) specifies a ratio of the focal length of the lens unit Ln to the movement amount of the lens unit Ln during zooming. By satisfying the conditional expression (2), the zoom lens can be easily designed to achieve a high zoom ratio with a small lens system. If the negative focal length of the lens unit Ln is so long (if the absolute value of the negative focal length is so large) as to cause the ratio to fall below the lower limit value of the conditional expression (2), the position sensitivity is so low that a long stroke is necessary for focusing and for correcting an image plane variation. As a result, the total length of the zoom lens is inevitably long.

On the other hand, if the negative focal length of the lens unit Ln is so short as to cause the ratio to exceed the upper limit value of the conditional expression (2), the curvature of field is difficult to correct particularly at the wide angle end.

In Embodiments 1 to 5, the constituent elements are set appropriately to satisfy the conditional expressions (1) and (2) as described above. In this way, obtained is a zoom lens which includes a small lens system and achieves a high zoom ratio and favorable optical properties.

Note that it is more preferred that Embodiments 1 to 5 employ the following numerical value ranges for the conditional expressions (1) and (2):

$$-3.00 < f2/|M2| < -0.10 \quad (1a); \text{ and}$$

$$-1.80 < fn/|Mn| < -0.30 \quad (2a).$$

According to the present invention, use of the aforementioned configuration enables the realization of a zoom lens that achieves a high zoom ratio, is small in total size, and has favorable optical properties.

In addition, the zoom lens of the present invention is characterized by satisfying the following conditional expressions:

$$1.10 < \beta nT/\beta nW < 1.70 \quad (3);$$

$$0.20 < drt/|M2| < 1.30 \quad (4); \text{ and}$$

$$0.01 < dnpw/drw < 0.40 \quad (5),$$

where βnW denotes a lateral magnification of the lens unit Ln at the wide angle end, βnT denotes the lateral magnification of the lens unit Ln at the telephoto end, dnpw denotes a distance in the optical axis direction from the lens surface of the lens unit Ln closest to the object to the lens surface of the lens unit Lp closest to the image plane at the wide angle end, drw denotes a distance in the optical axis direction from the aperture stop SP to the image plane at the wide angle end, and drt denotes a distance in the optical axis direction from the aperture stop SP to the image plane at the telephoto end.

Satisfying the conditional expressions (3), (4), and (5) enables the realization of a zoom lens which achieves a high zoom ratio, is small in total size, and has favorable optical properties in the entire zooming range.

The conditional expression (3) specifies a zoom ratio of the lens unit Ln. By satisfying the conditional expression (3), a zoom lens can have a small lens system and obtain favorable optical properties.

If the zoom ratio of the lens unit Ln is so low as to fall below the lower limit value of the conditional expression (3), the second lens unit L2 that is the primary magnification lens unit needs to take charge of such a large proportion of the zooming that a curvature of field variation and a lateral chromatic aberration variation due to zooming become large.

On the other hand, if the zoom ratio of the lens unit Ln is so high as to exceed the upper limit value of the conditional expression (3), the focal length of the negative lens unit Ln is too short. In this case, the curvature of field is difficult to correct particularly at the wide angle end. In addition, a curvature of field variation and a lateral chromatic aberration variation due to focusing are increased.

The conditional expression (4) specifies a ratio of a stroke of the second lens unit L2 for zooming (a movement amount on the optical axis) to a distance from the aperture stop SP to the image plane.

By satisfying the conditional expression (4), a zoom lens can have a small lens system and obtain favorable optical properties.

If the distance from the aperture stop SP to the image plane is so short as to cause the ratio to fall below the lower limit value of the conditional expression (4), the negative refractive power of the lens unit Ln is too strong (the absolute value of the negative refractive power is too large). In this case, increased are an image plane variation due to zooming, and a curvature-of-field variation and a lateral chromatic aberration variation due to focusing.

On the other hand, if the distance from the aperture stop SP to the image plane is so long as to cause the ratio to exceed the upper limit value of the conditional expression (4), the total length of the zoom lens is inevitably long.

The conditional expression (5) specifies a distance in the optical axis direction from the object-side lens surface of the lens unit Ln to the image-side lens surface of the lens unit Lp at the wide angle end.

By satisfying the conditional expression (5), a zoom lens can have a small lens system and obtain favorable optical properties.

If the distance in the optical axis direction from the object-side lens surface of the lens unit Ln to the image-side lens surface of the lens unit Lp at the wide angle end is so short as to fall below the lower limit value of the conditional expression (5), the curvature of field is so increased particularly at the wide angle end that the curvature of field is difficult to correct.

On the other hand, if the distance on the optical axis direction from the object-side lens surface of the lens unit Ln to the image-side lens surface of the lens unit Lp at the wide angle end is so long as to exceed the upper limit value of the conditional expression (5), the total length of the zoom lens is inevitably long.

Note that it is preferred that Embodiments 1 to 5 employ the following numerical value ranges for the conditional expressions (3), (4), and (5):

$$1.15 < \beta nT/\beta nW < 1.60 \quad (3a);$$

$$0.50 < drt/|M2| < 1.25 \quad (4a); \text{ and}$$

$$0.05 < dnpw/drw < 0.30 \quad (5a).$$

In addition, the zoom lens of the present invention is also characterized by satisfying the following conditional expression:

$$4.5 < |f1/fn| < 10.0 \quad (6),$$

where f1 denotes the focal length of the first lens unit L1, and fn denotes the focal length of the lens unit Ln.

The conditional expression (6) specifies a ratio of the focal length of the first lens unit L1 to the focal length of the lens unit Ln. By satisfying the conditional expression (6), a zoom lens can achieve a high zoom ratio and obtain favorable optical properties.

If the positive focal length of the first lens unit L1 is so short (the positive refractive power is so strong) as to cause the ratio to fall below the lower limit value of the conditional expression (6), a spherical aberration and an axial chromatic aberration are so increased particularly at the telephoto end that these aberrations are difficult to correct.

Meanwhile, if the negative focal length of the lens unit Ln is so long (if the absolute value of the negative refractive power is so small) as to cause the ratio to fall below the lower limit value of the conditional expression (6), the position sensitivity is so low that a long stoke is necessary for focusing and correcting an image plane variation during zooming. As a result, the total length of the zoom lens inevitably becomes long.

On the other hand, if the focal length of the first lens unit L1 is so long as to cause the ratio to exceed the upper limit of the conditional expression (6), the second lens unit L2 needs to be made capable of a long stroke to achieve a high zoom ratio, and the total length of the zoom lens inevitably becomes long.

Meanwhile, if the negative focal length of the lens unit Ln is so short (if the absolute value of the negative refractive power is so large) as to cause the ratio to exceed the upper limit value of the conditional expression (6), the curvature of field is difficult to correct particularly at the wide angle end.

Note that it is preferred that Embodiments 1 to 5 employ the following numerical value range for the conditional expression (6):

$$5.0 < |f1/fn| < 7.5 \quad (6a).$$

The zoom lens of the present invention preferably satisfies at least one of the following conditional expressions. Specifically, $\beta nT$ denotes the lateral magnification of the lens unit Ln at the telephoto end, and $\beta pT$ denotes the lateral magnification of the lens unit Lp at the telephoto end. The lens unit Ln includes a single negative lens, and ndn denotes a refractive power a material for the single negative lens. The lens unit Lp includes a single positive lens, and ndp denotes a refractive power a material for the single positive lens. In addition, f1 denotes the focal length of the first lens unit L1. The rear group LR includes one or more lens units on the object side of the lens unit Ln. Provided that a third lens unit denotes the lens unit arranged closest to the object among the lens units included in the read group LR, f3 denotes the focal length of the third lens unit, and M3 denotes the movement amount of the third lens unit during zooming from the wide angle end to the telephoto end.

Given the above definitions, the zoom lens preferably satisfies at least one of the following conditional expressions:

$$0.7 < f2/fn < 2.0 \quad (7)$$

$$-5.0 < (1-\beta nT^2) \times \beta pT^2 < -2.0 \quad (8)$$

$$1.7 < ndn < 2.1 \quad (9)$$

$$1.5 < ndp < 1.9 \quad (10)$$

$$2.5 < f1/f3 < 6.0 \quad (11); \text{ and}$$

$$1.2 < f3/|M3| < 4.0 \quad (12).$$

Next, description will be provided for technical meanings of the above conditional expressions. The conditional expression (7) specifies a ratio of the focal length of the second lens unit L2 to the focal length of the negative lens unit Ln. By satisfying the conditional expression (7), a zoom lens can have a small lens system and obtain favorable optical properties. If the focal length of the second lens unit L2 is so short as to cause the ratio to fall below the lower limit value of the conditional expression (7), a curvature-of-field variation and a lateral chromatic aberration variation due to zooming become large.

Meanwhile, if the negative focal length of the negative lens unit Ln is so long as to cause the ratio to fall below the lower limit value of the conditional expression (7), the position sensitivity is so low that a long stroke is necessary for focusing and correcting an image plane variation during zooming and a stroke for focusing have to be long. As a result, the total length of the zoom lens is inevitably long.

On the other hand, if the negative focal length of the second lens unit L2 is so long as to cause the ratio to exceed the upper limit value of the conditional expression (7), a long stroke is necessary to achieve a high zoom ratio. As a result, the total length of the zoom lens is inevitably long. Meanwhile, if the negative focal length of the negative lens unit Ln is so short as to cause the ratio to exceed the upper limit value of the conditional expression (7), the curvature of field is so increased particularly at the wide angle end that the curvature of field is difficult to correct.

The conditional expression (8) specifies the position sensitivity of the negative lens unit Ln at the telephoto end. By satisfying the conditional expression (8), a zoom lens can achieve both of a small lens system and favorable optical properties. The position sensitivity of the negative lens unit Ln is not preferred to be so low as to fall below the lower limit value of the conditional expression (8). This is because, in that case, a zoom lens configured to achieve a high zoom ratio needs to perform a long stroke for focusing and correcting the position of the image plane at the telephoto end, with the result that the total length of the zoom lens is inevitably long.

On the other hand, the position sensitivity of the negative lens unit Ln is not preferred to be so high as to exceed the upper limit value of the conditional expression (8). This is because the negative focal length of the lens unit Ln is so short that the curvature of field is difficult to correct particularly at the wide angle end.

The conditional expression (9) specifies the refractive power of the material for the negative lens included in the lens unit Ln having the negative refractive power. By satisfying the conditional expression (9), a zoom lens can be small in total size and obtain favorable optical properties. If the refractive power of the material for the negative lens is so low as to fall below the lower limit value of the conditional expression (9), the curvature radius of the lens surface of the negative lens needs to be made small for obtaining a predetermined negative refractive power. As a result, the curvature of field is so increased particularly at the wide angle end that the curvature of field is difficult to correct.

On the other hand, if the refractive power of the material for the negative lens is so high as to exceed the upper limit value of the conditional expression (9), the Petzval sum of the total lens system is too small. In this case, a curvature of field and an astigmatism are so increased that these aberrations are difficult to correct.

The conditional expression (10) specifies the refractive power of the material for the positive lens included in the lens unit Lp having the positive refractive power. By satisfying the conditional expression (10), a zoom lens can have a small lens system and obtain favorable optical properties. If the refractive power of the material for the positive lens is so low as to fall below the lower limit value of the conditional expression (10), the positive lens has a large thickness, and the total length of the zoom lens inevitably is long. On the other hand, if the refractive power of the material for the positive lens is so high as to exceed the upper limit value of the conditional expression (10), the Petzval sum is so increased that the astigmatism is difficult to correct.

The conditional expression (11) specifies a ratio of the focal length of the first lens unit L1 to the focal length of the lens unit closest to the object in the rear group LR (the third lens unit L3 in Embodiments 1 to 5). By satisfying the conditional expression (11), a zoom lens can have a small lens system and obtain favorable optical properties. If the focal length of the first lens unit L1 is so short as to cause the ratio to fall below the lower limit value of the conditional expression (11), a spherical aberration and an axial chromatic aberration are so increased particularly at the telephoto end that these aberrations are difficult to correct. Meanwhile, if the focal length of the lens unit closest to the object in the rear group LR is so long as to cause the ratio to fall below the lower limit value of the conditional expression (11), a long stroke is necessary for zooming, and consequently the total length of the zoom lens inevitably becomes long.

On the other hand, if the focal length of the first lens unit L1 is so long as to cause the ratio to exceed the upper limit value of the conditional expression (11), a zoom lens configured to achieve a high zoom ratio has a long total length. Meanwhile, if the focal length of the lens unit closest to the object in the rear group LR is so short as to cause the ratio to exceed the upper limit value of the conditional expression (11), a spherical aberration and a coma are so increased particularly at the wide angle end that these aberrations are difficult to correct.

The conditional expression (12) specifies a ratio of the focal length of the lens unit closest to the object in the rear group LR (the third lens unit L3 in Embodiments 1 to 5) to the movement amount of the lens unit closest to the object in the rear group LR during zooming. By satisfying the conditional expression (12), a zoom lens can have a small lens system and achieve a high zoom ratio. If the focal length of the lens unit closest to the object in the rear group LR is so short as to cause the ratio to fall below the lower limit value of the conditional expression (12), a spherical aberration and an axial chromatic aberration are difficult to correct particularly at the wide angle end.

On the other hand, if the focal length of the lens unit closest to the object in the rear group LR is so long as to cause the ratio to exceed the upper limit value of the conditional expression (12), a zoom lens configured to achieve a high zoom ratio has a long total length. Note that it is more preferred that Embodiments 1 to 5 employ the following numerical value ranges for the conditional expressions (7) to (12):

$$0.75 < f2/fn < 1.50 \quad (7a);$$

$$-4.8 < (1-\beta nT^2) \times \beta pT^2 < -2.5 \quad (8a);$$

$$1.80 < ndn < 2.00 \quad (9a);$$

$$1.55 < ndp < 1.88 \quad (10a);$$

$$2.7 < f1/f3 < 4.5 \quad (11a); \text{ and}$$

$$2.0 < f3/|M3| < 3.5 \quad (12a).$$

In addition, the zoom lens of the present invention may preferably satisfy at least one of the following conditional expressions:

$$-4.0 < f2/fw < -1.0 \quad (13); \text{ and}$$

$$-0.10 < fn/ft < -0.01 \quad (14),$$

where fw denotes the focal length of the zoom lens at the wide angle end, and ft denotes the focal length of the zoom lens at the telephoto end.

The conditional expression (13) specifies a ratio of the focal length of the second lens unit L2 to the focal length of the zoom lens at the wide angle end.

By satisfying the conditional expression (13), a zoom lens can have a small lens system and obtain favorable optical properties.

If the negative focal length of the second lens unit L2 is so long (if the absolute value of the negative focal length is so large) as to cause the ratio to fall below the lower limit value of the conditional expression (13), a long stroke is necessary for zooming, and consequently the total length of the zoom lens becomes long.

On the other hand, if the negative focal length of the second lens unit L2 is so short (if the absolute value of the negative focal length is so small) as to cause the ratio to exceed the upper limit value of the conditional expression (13), a curvature-of-field variation and a lateral chromatic aberration variation due to zooming become large.

The conditional expression (14) satisfies a ratio of the negative focal length of the negative lens unit Ln to the focal length of the zoom lens at the telephoto end. By satisfying the conditional expression (14), a zoom lens can have a small lens system and obtain favorable optical properties. If the negative focal length of the negative lens unit Ln is so short as to cause the ratio to exceed the upper limit value of the conditional expression (14), the curvature of field is difficult to correct particularly at the wide angle end. On the other hand, if the negative focal length of the negative lens unit Ln is so long as to cause the ratio to fall below the lower limit value of the conditional expression (14), the positive sensitivity is so low that a long stroke is necessary for focusing and for correcting an image plane variation during zooming, with the result that the total length of the zoom lens is increased.

Note that it is more preferred that Embodiments 1 to 5 employ the following numerical value ranges for the conditional expressions (13) and (14):

$$-2.5 < f2/fw < -1.2 \quad (13a); \text{ and}$$

$$-0.07 < fn/ft < -0.03 \quad (14a).$$

In addition, the zoom lens of the present invention preferably satisfies at least one of the following conditional expressions:

$$2.0 < f1/fp < 8.0 \quad (15);$$

$$0.3 < |f2/fp| < 1.5 \quad (16);$$

$$1.0 < |fn/fw| < 4.0 \quad (17);$$

$$0.03 < fp/ft < 0.15 \quad (18);$$

$$20.0 < \beta 2T/\beta 2W < 200.0 \quad (19);$$

$$0.40 < TD/ft < 0.80 \quad (20);$$

$$0.2 < |f2/f3| < 1.0 \quad (21); \text{ and}$$

$$0.10 < \beta 3T/\beta 3W < 2.00 \quad (22),$$

where fp denotes the focal length of the lens unit Lp, β2T denotes the lateral magnification of the second lens unit L2 at the telephoto end, β2W denotes the lateral magnification of the second lens unit L2 at the wide angle end, TD denotes the total length of the zoom lens, f3 denotes the focal length of the lens unit closest to the object in the rear group LR, β3W denotes the lateral magnification of the lens unit closest to the object in the rear group LR at the wide angle end, and β3T denotes the lateral magnification of the lens unit closest to the object in the rear group LR at the telephoto end.

The conditional expression (15) satisfies a ratio of the focal length of the first lens unit L1 to the focal length of the positive lens unit Lp. By satisfying the conditional expression (15), a zoom lens can have a small lens system and obtain favorable optical properties. If the focal length of the first lens unit L1 is so short as to cause the ratio to fall below the lower limit value of the conditional expression (15), a spherical aberration and an axial chromatic aberration are so increased particularly at the telephoto end that these aberrations are difficult to correct. Meanwhile, if the focal length of the positive lens unit Lp is so long as to cause the ratio to fall below the lower limit value of the conditional expression (15), the back focus is so long that the total length of the zoom lens inevitably is long.

On the other hand, if the focal length of the first lens unit L1 is so long as to cause the ratio to exceed the upper limit value of the conditional expression (15), a zoom lens configured to achieve a high zoom ratio is long in total size. Meanwhile, if the focal length of the positive lens unit Lp is so short as to cause the ratio to exceed the upper limit value of the conditional expression (15), a curvature of field and a lateral chromatic aberration are so increased across the entire zooming range that these aberrations are difficult to correct.

The conditional expression (16) specifies a ratio of the focal length of the second lens unit L2 to the focal length of the positive lens unit Lp. By satisfying the conditional expression (16), a zoom lens can have a small lens system and obtain favorable optical properties. If the focal length of the second lens unit L2 is so short as to cause the ratio to fall below the lower limit value of the conditional expression (16), a curvature-of-field variation and a lateral chromatic aberration variation due to zooming become too large. Meanwhile, if the focal length of the positive lens unit Lp is so long as to cause the ratio to fall below the lower limit value of the conditional expression (16), the back focus becomes so long that the total length of the zoom lens inevitably becomes long.

On the other hand, if the focal length of the second lens unit L2 is so long as to cause the ratio to exceed the upper limit value of the conditional expression (16), a long stroke is necessary to achieve a high zoom ratio. As a result, the total length of the zoom lens becomes long. Meanwhile, if the focal length of the positive lens unit Lp is so short as to cause the ratio to exceed the upper limit value of the conditional expression (16), a curvature of field and a lateral chromatic aberration are so increase across the entire zooming range that these aberrations are difficult to correct.

The conditional expression (17) specifies a ratio of the negative focal length of the negative lens unit Ln to the focal length of the zoom lens at the wide angle end. By satisfying the conditional expression (17), a zoom lens can have a small lens system and obtain favorable optical properties. If the negative focal length of the negative lens unit Ln is so short as to cause the ratio to fall below the lower limit value of the conditional expression (17), the curvature of field is difficult to correct particularly at the wide angle end. On the other hand, if the negative focal length of the negative lens unit Ln is so long as to cause the ratio to exceed the upper limit value of the conditional expression (17), the position sensitivity is so low that a long stroke is necessary for focusing and correcting an image plane variation during zooming and consequently the total length of the zoom lens is increased.

The conditional expression (18) specifies a ratio of the positive focal length of the positive lens unit Lp to the focal length of the zoom lens at the telephoto end. By satisfying the conditional expression (18), a zoom lens can have a small lens system and obtain favorable optical properties. If the focal length of the positive lens unit Lp is so short as to cause the ratio to fall below the lower limit value of the conditional expression (18), a curvature of field and a lateral chromatic aberration are so increased across the entire zooming range that these aberrations are difficult to correct. On the other hand, if the focal length of the positive lens unit Lp is so long as to cause the ratio to exceed the upper limit value of the conditional expression (18), the back focus becomes so long that the total length of the zoom lens inevitably becomes long.

The conditional expression (19) specifies a zoom ratio of the second lens unit L2. By satisfying the conditional expression (19), a zoom lens can have a small lens system and obtain favorable optical properties. If the zoom ratio of the second lens unit L2 is so low as to fall below the lower limit value of the conditional expression (19), the focal length of the negative lens unit Ln is made too short for increasing the zoom ratio of the rear group LR, and resultantly the curvature of field is difficult to correct particularly at the wide angle end. On the other hand, if the zoom ratio of the second lens unit L2 is so high as to exceed the upper limit value of the conditional expression (19), the focal length of the second lens unit L2 is too short, and resultantly a curvature-of-field variation and a lateral chromatic aberration variation during zooming become large.

The conditional expression (20) specifies a ratio of the total length of the zoom lens to the focal length of the zoom lens at the telephoto end. By satisfying the conditional expression (20), a zoom lens can achieve both a small lens system and favorable optical properties. If the total length of the zoom lens is so short relative to the focal length of the zoom lens at the telephoto end as to cause the ratio to fall below the lower limit value of the conditional expression (20), the focal length of the first lens unit L1 is too short. As a result, at the telephoto end, in particular, a spherical aberration and an axial chromatic aberration are so increased that these aberrations are difficult to correct. In addition, the focal length of the second lens unit L2 is also so short that a curvature-of-field variation and a lateral chromatic aberration variation during zooming become large.

On the other hand, if the total length of the zoom lens is so long relative to the focal length of the zoom lens at the telephoto end as to cause the ratio to exceed the upper limit value of the conditional expression (20), the lens outer diameter (effective diameter) of the first lens unit L1 becomes large and accordingly the zoom lens is increased in total size.

The conditional expression (21) specifies a ratio of the focal length of the second lens unit L2 to the focal length of the lens unit closest to the object in the rear group LR (the third lens unit L3 in Embodiments 1 to 5). By satisfying the conditional expression (21), a zoom lens can have a small lens system and obtain favorable optical properties. If the negative focal length of the second lens unit L2 is so short as to cause the ratio to fall below the lower limit value of the conditional expression (21), a curvature-of-field variation and a lateral chromatic aberration variation due to zooming become large. Meanwhile, if the focal length of the lens unit closest to the object in the rear group LR is so long as to cause the ratio to fall below the lower limit value of the conditional expression (21), a long stroke is necessary for zooming and consequently the total length of the zoom lens inevitably becomes long.

On the other hand, if the focal length of the second lens unit L2 is so long as to cause the ratio to exceed the upper limit value of the conditional expression (21), a long stroke is necessary to achieve a high zoom ratio. As a result, the total length of the zoom lens inevitably becomes long. Meanwhile, if the focal length of the lens unit closest to the object in the rear group LR is so short as to cause the ratio to exceed the upper limit value of the conditional expression (21), a spherical aberration and a coma are so increased particularly at the wide angle end that these aberrations are difficult to correct.

The conditional expression (22) specifies a zoom ratio of the lens unit closest to the object in the rear group LR. By satisfying the conditional expression (22), a zoom lens can have a small lens system and obtain favorable optical properties. If the zoom ratio of the lens unit closest to the object in the rear group LR is so low as to fall below the lower limit value of the conditional expression (22), the second lens unit L2 that is the primary magnification lens unit needs to take charge of such a large proportion of the zooming that a curvature-of-field variation and a lateral chromatic aberration variation during zooming become large.

On the other hand, if the zoom ratio of the lens unit closest to the object in the rear group LR is so high as to exceed the upper limit value of the conditional expression (22), the focal length of the lens unit closest to the object in the rear group LR is too short. In this case, at the wide angle end in particular, a spherical aberration and a coma are so increased that these aberrations are difficult to correct.

Note that it is more preferred that Embodiments 1 to 5 employ the following numerical value ranges for the conditional expressions (15) to (22):

$$3.0 < f1/fp < 6.0 \quad (15a);$$

$$0.4 < |f2/fp| < 0.8 \quad (16a);$$

$$1.5 < |fn/fw| < 3.0 \quad (17a);$$

$$0.05 < fp/ft < 0.10 \quad (18a);$$

$$25.0 < \beta2T/\beta2W < 170.0 \quad (19a)$$

$$0.45 < TD/ft < 0.70 \quad (20a)$$

$$0.3 < |f2/f3| < 0.7 \quad (21a); \text{ and}$$

$$0.12 < \beta3T/\beta3W < 1.50 \quad (22a).$$

In Embodiments 1 to 5, the constituent elements are configured as descried above, so that a zoom lens is obtained which is small in size, achieves a high zoom ratio, and has favorable optical properties in the entire zooming range. It should be noted that the effects of the present invention can be further enhanced by combining two or more of the foregoing conditional expressions as needed. Moreover, it is preferred to configure a zoom lens of the present invention in the following way with the view of aberration corrections.

Preferably, the rear group LR includes a lens unit on the object side of the lens unit Ln, and this lens unit moves during zooming. Preferably, the first lens unit L1 includes, in order from the object side to the image side, a negative lens, a positive lens, a positive lens, and a positive lens. Preferably, the second lens unit L2 includes, in order from the object side to the image side, a negative lens, a positive lens, a negative lens, and a positive lens. Instead, the second lens unit L2 preferably includes, in order from the object side to the image side, a negative lens, a negative lens, a negative lens, and a positive lens.

Preferably, the lens unit closest to the object in the rear group LR is a positive lens solely, or includes, in order from the object side to the image side, a positive lens, a negative lens, a positive lens, and a positive lens.

Next, the lens configurations of the lens units in Embodiments 1 to 5 will be described. In the configuration of each of the lens units, the constituent lenses are arranged in order from the object side to the image side, unless otherwise specified.

Embodiment 1

The first lens unit L1 includes a cemented lens in which a negative meniscus lens having a convex surface on the object side and a positive meniscus lens having a convex surface on the object side are joined together, a positive meniscus lens having a convex surface on the object side, and a positive meniscus lens having a convex surface on the object side. In this embodiment, use of the three positive lenses eliminates a necessity for the three lenses to have high refractive powers on their respective lens surfaces. Hence, in the case of a zoom lens designed with a high zoom ratio, in particular, this lens configuration enables effective reductions of aberrations at the telephoto end such as an axial chromatic aberration, a spherical aberration, and a coma.

The second lens unit L2 includes a negative meniscus lens having a convex surface on the object side, a cemented lens in which a positive lens having a concave surface on the object side and a biconcave negative lens are joined together, and a positive meniscus lens having a convex surface on the object side. This lens configuration enables effective corrections of a curvature of field at the wide angle end and of a lateral chromatic aberration in the entire zooming range.

The third lens unit L3 includes a biconvex positive lens having aspheric surfaces on both sides. With this lens configuration, the third lens unit L3 performs effective corrections of the spherical aberration and the coma particularly at the wide angle end.

The fourth lens unit L4 includes a cemented lens in which a positive meniscus lens having a convex surface on the object side, and a negative meniscus lens having a convex surface on the object side are joined together, and a biconvex positive lens having aspheric surfaces on both sides. Including the cemented lens, the fourth lens unit L4 reduces the occurrence of the axial chromatic aberration in the entire zooming range. In addition, including the positive lens with the aspheric surfaces on both sides, the fourth lens unit L4 reduces the occurrence of the spherical aberration and the coma in the entire zooming range while achieving a high zoom ratio.

The fifth lens unit L5 includes a biconcave negative lens. Including only one negative lens enables weight reduction and facilitates quick control for focusing.

The sixth lens unit L6 includes a biconvex positive lens. Thus, use of the lens unit having the positive refractive power as the last lens unit leads to such enhanced telecentricity as to cause off-axial rays to enter the image pickup element at approximately right angles and thereby to reduce a light volume drop at the periphery of the field due to shading.

Embodiment 2

The lens configurations of the lens units of Embodiment 2 are the same as those in Embodiment 1.

Embodiment 3

The lens configurations of the first lens unit L1, the second lens unit L2, and the third lens unit L3 of Embodiment 3 are the same as those in Embodiment 1. The fourth lens unit L4 includes a negative meniscus lens having a convex surface on the object side, a positive meniscus lens having a convex surface on the object side, and a biconvex positive lens having aspheric surfaces on both sides. The lens configurations of the fifth lens unit L5 and the sixth lens unit L6 are the same as those in Embodiment 1.

Embodiment 4

The lens configuration of the first lens unit L1 of Embodiment 4 is the same as that in Embodiment 1. The second lens unit L2 includes a negative meniscus lens having a convex surface on the object side, a negative meniscus lens having a convex surface on the object side, a biconcave negative lens, and a biconvex positive lens. The third lens unit L3 includes a positive lens having a convex aspheric surface on the object side, a cemented lens in which a negative meniscus lens having a convex surface on the object side and a positive meniscus lens having a convex surface on the object side are joined together, and a biconvex positive lens having aspheric surfaces on both sides.

The fourth lens unit L4 includes a single biconcave negative lens. The fifth lens unit L5 includes a single biconvex positive lens.

Embodiment 5

The lens configurations of the lens units of Embodiment 5 are the same as those in Embodiment 4.

Next, with reference to FIG. 11, description will be provided for an embodiment of an image pickup apparatus (monitoring camera) in which a zoom lens according to the present invention is used as an image pickup optical system.

In FIG. 11, 10 is a monitoring camera main body, 11 is an image pickup optical system composed of any of the zoom lenses described in Embodiments 1 to 5, 12 is an image pickup element (photoelectric conversion element), such as a CCD sensor or a CMOS sensor, which is incorporated in the camera main body, and is configured to receive light of a subject image formed by the image pickup optical system 11, 13 is a memory configured to record information containing the subject image photoelectrically-converted by the image pickup element 12, and 14 is a network cable for transferring the subject image photoelectrically-converted by the image pickup element 12.

The image pickup apparatus is not limited to the monitoring camera, but the zoom lens of the present invention may be used similarly in a video camera, a digital camera, or the like.

Besides any of the foregoing zoom lens, the image pickup apparatus of the present invention may include a circuit configured to electrically correct either or both of a distortion and a lateral chromatic aberration. When the image pickup apparatus employs such configuration allowing a tolerance toward the distortion or other aberrations of the zoom lens, the total number of lenses in the zoom lens can be reduced, which makes downsizing of the zoom lens easier. In addition, use of a correction means for electrically collecting a lateral chromatic aberration makes it easier to reduce color blurring in picked-up images, and improve a resolving power of the picked-up images.

Although the preferred embodiments of the present invention have been described above, the present invention is not limited to these embodiments, but may be altered or modified without departing from the spirit of the present invention.

Next, numerical data 1 to 5 respectively corresponding to Embodiments 1 to 5 of the present invention will be presented. In the numerical data, i denotes the ordinal number of an optical surface from the object side, ri denotes the curvature radius of the i-th optical surface (the i-th surface), di denotes a distance between the i-th surface and the i+1-th surface, ndi and vdi denote a refractive power and an Abbe number, respectively, of the material for the optical component having the i-th surface based on the d-line.

BF denotes a back focus expressing a distance from the last lens surface to a paraxial image plane in terms of a length in air. The total length of the zoom lens is a sum of a length from the first lens surface to the last lens surface and the value of the back focus BF. The mark * indicates an aspheric surface, and k denotes an eccentricity. A4, A6, A8, and A10 are aspheric coefficients. Provided that x denotes a displacement from the surface vertex in the optical axis direction, the displacement measured in the position at a height H from the optical axis, the aspheric shape is expressed by:

$$x = (h^2/R)/[1+\{1-(1+k)(h/R)^2\}^{1/2}] + A4 \times h^4 + A6 \times h^6 + A8 \times h^8 + A10 \times h^{10},$$

where R denotes a paraxial curvature radius.

Then, "e-x" indicates "$\times 10^{-x}$". Tables 1 and 2 present numerical data of Examples corresponding to the foregoing conditional expressions.

[Numerical Data 1]

[unit: mm]

Surface Data

| surface no. i | ri | di | ndi | vdi |
|---|---|---|---|---|
| 1 | 64.609 | 1.40 | 1.85478 | 24.8 |
| 2 | 38.459 | 5.06 | 1.49700 | 81.5 |
| 3 | 290.666 | 0.15 | | |
| 4 | 40.050 | 3.04 | 1.59522 | 67.7 |
| 5 | 157.406 | 0.10 | | |
| 6 | 32.512 | 2.52 | 1.59522 | 67.7 |
| 7 | 68.128 | (variable) | | |
| 8 | 62.804 | 0.65 | 2.00100 | 29.1 |
| 9 | 7.075 | 4.71 | | |
| 10 | −22.167 | 1.94 | 1.95906 | 17.5 |
| 11 | −9.528 | 0.45 | 1.88300 | 40.8 |
| 12 | 32.706 | 0.12 | | |
| 13 | 16.243 | 1.22 | 1.92286 | 18.9 |
| 14 | 40.881 | (variable) | | |
| 15(stop) | ∞ | (variable) | | |
| 16* | 10.955 | 5.37 | 1.55332 | 71.7 |
| 17* | −21.087 | (variable) | | |
| 18 | 9.788 | 2.13 | 1.48749 | 70.2 |
| 19 | 29.249 | 0.50 | 2.00100 | 29.1 |
| 20 | 7.210 | 2.46 | | |
| 21* | 8.973 | 3.53 | 1.55332 | 71.7 |
| 22* | −17.677 | (variable) | | |
| 23 | −128.328 | 0.40 | 1.88300 | 40.8 |
| 24 | 6.353 | (variable) | | |
| 25 | 12.655 | 2.59 | 1.66672 | 48.3 |
| 26 | −14.832 | 2.38 | | |
| 27 | ∞ | 2.00 | 1.51633 | 64.1 |
| 28 | ∞ | 0.50 | | |
| image plane | ∞ | | | |

Aspheric Surface Data

16th surface

K = −7.90957e−001
A4 = −2.44765e−005
A6 = 1.56884e−007
A8 = −2.31065e−009
A10 = −3.06071e−012

17th surface

K = 0.00000e+000
A4 = 1.15112e−004
A6 = −4.15838e−007
A8 = −8.60580e−011

21th surface

K = −2.34811e−001
A4 = −4.61556e−005
A6 = −2.12700e−006
A8 = −1.92241e−008
A10 = 4.61138e−010

22th surface

K = 0.00000e+000
A4 = −2.58984e−006
A6 = −1.88828e−006
A8 = 1.51967e−009

Various Data
Zoom Ratio 39.08

| | Wide Angle | Middle | Telephoto |
|---|---|---|---|
| Focal Length | 3.82 | 38.78 | 149.39 |
| F-NUMBER | 1.65 | 3.00 | 4.94 |
| Half Angle of View (degs.) | 41.0 | 4.61 | 1.23 |
| Image Height | 3.20 | 3.20 | 3.20 |
| Lens Total Length | 87.43 | 87.43 | 87.43 |
| BF | 4.20 | 4.20 | 4.20 |
| d7 | 0.52 | 25.61 | 31.12 |
| d14 | 31.66 | 6.57 | 1.06 |
| d15 | 5.56 | 1.98 | 0.67 |
| d17 | 2.12 | 0.85 | 2.43 |
| d22 | 1.98 | 7.29 | 1.87 |
| d24 | 3.05 | 2.59 | 7.73 |

Zoom lens unit Data

[unit: mm]

| Unit | Start Surface | Focal Length |
|---|---|---|
| 1 | 1 | 43.99 |
| 2 | 8 | -5.99 |
| 3 | 16 | 13.86 |
| 4 | 18 | 26.48 |
| 5 | 23 | -6.85 |
| 6 | 25 | 10.64 |

[Numerical Data 2]

[unit: mm]

Surface Data

| surface no. i | ri | di | ndi | vdi |
|---|---|---|---|---|
| 1 | 65.363 | 1.40 | 1.85478 | 24.8 |
| 2 | 39.383 | 5.61 | 1.49700 | 81.5 |
| 3 | 264.287 | 0.15 | | |
| 4 | 42.131 | 3.48 | 1.59522 | 67.7 |
| 5 | 184.272 | 0.10 | | |
| 6 | 34.209 | 2.78 | 1.59522 | 67.7 |
| 7 | 68.015 | (variable) | | |
| 8 | 62.330 | 0.65 | 2.00100 | 29.1 |
| 9 | 7.085 | 4.63 | | |
| 10 | -23.745 | 1.95 | 1.95906 | 17.5 |
| 11 | -9.790 | 0.45 | 1.88300 | 40.8 |
| 12 | 30.140 | 0.09 | | |
| 13 | 15.695 | 1.20 | 1.92286 | 18.9 |
| 14 | 35.702 | (variable) | | |
| 15(stop) | ∞ | (variable) | | |
| 16* | 12.672 | 5.08 | 1.69350 | 53.2 |
| 17* | -29.444 | (variable) | | |
| 18 | 10.161 | 2.58 | 1.48749 | 70.2 |
| 19 | 105.544 | 0.50 | 2.00100 | 29.1 |
| 20 | 7.139 | 2.27 | | |
| 21* | 9.111 | 3.66 | 1.55332 | 71.7 |
| 22* | -12.790 | (variable) | | |
| 23 | -242.373 | 0.40 | 1.91082 | 35.3 |
| 24 | 6.669 | (variable) | | |
| 25 | 12.126 | 2.64 | 1.60342 | 38.0 |
| 26 | -14.973 | 2.68 | | |
| 27 | ∞ | 2.00 | 1.51633 | 64.1 |
| 28 | ∞ | 0.50 | | |
| image plane | ∞ | | | |

Aspheric Surface Data

16th surface

K = -7.71248e-001
A4 = -2.09334e-005
A6 = -2.32030e-007
A8 = -1.69990e-009
A10 = -1.38448e-011

17th surface

K = 0.00000e+000
A4 = 5.46054e-005
A6 = -4.79822e-007
A8 = 2.68075e-010

21th surface

K = -4.49533e-001
A4 = -9.73472e-005
A6 = -2.95376e-006
A8 = -5.87818e-008
A10 = 1.57735e-009

22th surface

K = 0.00000e+000
A4 = -2.91512e-006

[unit: mm]

A6 = -4.21269e-006
A8 = 6.53932e-009

Various Data
Zoom Ratio 43.95

| | Wide Angle | Middle | Telephoto |
|---|---|---|---|
| Focal Length | 3.83 | 38.73 | 168.13 |
| F-NUMBER | 1.73 | 2.97 | 5.14 |
| Half Angle of View (degs.) | 41.0 | 4.63 | 1.10 |
| Image Height | 3.20 | 3.20 | 3.20 |
| Lens Total Length | 91.45 | 91.45 | 91.45 |
| BF | 4.50 | 4.50 | 4.50 |
| d7 | 0.52 | 27.19 | 33.04 |
| d14 | 33.63 | 6.96 | 1.11 |
| d15 | 5.61 | 2.66 | 0.66 |
| d17 | 1.39 | 0.77 | 2.02 |
| d22 | 2.07 | 7.17 | 1.87 |
| d24 | 4.11 | 2.57 | 8.62 |

Zoom lens unit Data

| Unit | Start Surface | Focal Length |
|---|---|---|
| 1 | 1 | 46.42 |
| 2 | 8 | -5.92 |
| 3 | 16 | 13.44 |
| 4 | 18 | 26.21 |
| 5 | 23 | -7.12 |
| 6 | 25 | 11.53 |

[Numerical Data 3]

[unit: mm]

Surface Data

| surface no. i | ri | di | ndi | vdi |
|---|---|---|---|---|
| 1 | 52.639 | 1.40 | 2.00069 | 25.5 |
| 2 | 35.816 | 5.41 | 1.49700 | 81.5 |
| 3 | 201.153 | 0.15 | | |
| 4 | 41.082 | 2.91 | 1.59522 | 67.7 |
| 5 | 123.708 | 0.10 | | |
| 6 | 30.700 | 3.09 | 1.59522 | 67.7 |
| 7 | 71.843 | (variable) | | |
| 8 | 41.302 | 0.65 | 2.00100 | 29.1 |
| 9 | 6.713 | 4.82 | | |
| 10 | -30.942 | 2.01 | 1.95906 | 17.5 |
| 11 | -11.476 | 0.45 | 1.91082 | 35.3 |
| 12 | 25.266 | 0.16 | | |
| 13 | 15.297 | 1.52 | 1.95906 | 17.5 |
| 14 | 61.954 | (variable) | | |
| 15(stop) | ∞ | (variable) | | |
| 16* | 12.972 | 3.46 | 1.69350 | 53.2 |
| 17* | -29.430 | (variable) | | |
| 18 | 1359.110 | 0.50 | 2.00069 | 25.5 |
| 19 | 12.092 | 0.10 | | |
| 20 | 8.803 | 1.46 | 1.49700 | 81.5 |
| 21 | 12.758 | 2.05 | | |
| 22* | 10.101 | 2.71 | 1.55332 | 71.7 |
| 23* | -14.182 | (variable) | | |
| 24 | -108.793 | 0.40 | 1.95375 | 32.3 |
| 25 | 7.392 | (variable) | | |

-continued

[unit: mm]

| | | | | |
|---|---|---|---|---|
| 26 | 20.768 | 1.99 | 1.80518 | 25.4 |
| 27 | −16.752 | 2.28 | | |
| 28 | ∞ | 2.00 | 1.51633 | 64.1 |
| 29 | ∞ | 0.50 | | |
| image plane | ∞ | | | |

Aspheric Surface Data

16th surface

K = −8.31665e−001
A4 = 2.31250e−005
A6 = 4.40949e−007
A8 = 4.80355e−009

17th surface

K = 0.00000e+000
A4 = 1.20953e−004
A6 = 1.80874e−007

22th surface

K = −3.73810e−001
A4 = −1.01992e−004
A6 = −4.01433e−007
A8 = −4.16124e−008

23th surface

K = 0.00000e+000
A4 = 2.29459e−004
A6 = −8.56894e−007

Various Data
Zoom Ratio 39.10

| | Wide Angle | Middle | Telephoto |
|---|---|---|---|
| Focal Length | 4.07 | 39.62 | 159.31 |
| F-NUMBER | 1.65 | 3.00 | 4.90 |
| Half Angle of View (degs.) | 38.5 | 4.55 | 1.15 |
| Image Height | 3.20 | 3.20 | 3.20 |
| Lens Total Length | 84.82 | 84.82 | 84.82 |
| BF | 4.09 | 4.09 | 4.09 |
| d7 | 0.52 | 24.77 | 30.09 |
| d14 | 30.30 | 6.06 | 0.73 |
| d15 | 5.39 | 2.84 | 0.49 |
| d17 | 2.86 | 0.89 | 0.81 |
| d23 | 4.36 | 7.67 | 1.89 |
| d25 | 1.97 | 3.18 | 11.38 |

Zoom lens unit Data

| Unit | Start Surface | Focal Length |
|---|---|---|
| 1 | 1 | 43.23 |
| 2 | 8 | −6.90 |
| 3 | 16 | 13.43 |
| 4 | 18 | 22.65 |
| 5 | 24 | −7.25 |
| 6 | 26 | 11.80 |

[Numerical Data 4]

[unit: mm]

Surface Data

| surface no. i | ri | di | ndi | νdi |
|---|---|---|---|---|
| 1 | 62.576 | 1.30 | 1.85478 | 24.8 |
| 2 | 37.070 | 4.95 | 1.49700 | 81.5 |
| 3 | 252.281 | 0.15 | | |
| 4 | 41.949 | 2.92 | 1.59522 | 67.7 |
| 5 | 151.204 | 0.10 | | |
| 6 | 30.883 | 3.01 | 1.59522 | 67.7 |

-continued

[unit: mm]

| | | | | |
|---|---|---|---|---|
| 7 | 75.090 | (variable) | | |
| 8 | 83.213 | 0.60 | 1.95375 | 32.3 |
| 9 | 7.196 | 2.77 | | |
| 10 | 34.663 | 0.50 | 1.80400 | 46.6 |
| 11 | 12.136 | 2.33 | | |
| 12 | −18.151 | 0.50 | 1.77250 | 49.6 |
| 13 | 57.022 | 0.10 | | |
| 14 | 20.195 | 2.03 | 1.95906 | 17.5 |
| 15 | −58.079 | (variable) | | |
| 16(stop) | ∞ | (variable) | | |
| 17* | 12.268 | 3.27 | 1.76450 | 49.1 |
| 18 | 162.077 | 5.16 | | |
| 19 | 21.450 | 0.45 | 2.00100 | 29.1 |
| 20 | 6.779 | 3.06 | 1.49700 | 81.5 |
| 21 | 32.750 | 1.11 | | |
| 22* | 8.568 | 3.25 | 1.49700 | 81.5 |
| 23* | −16.698 | (variable) | | |
| 24 | −97.247 | 0.40 | 1.95375 | 32.3 |
| 25 | 8.073 | (variable) | | |
| 26 | 14.299 | 2.14 | 1.76182 | 26.5 |
| 27 | −19.210 | 2.29 | | |
| 28 | ∞ | 2.00 | 1.51633 | 64.1 |
| 29 | ∞ | 0.50 | | |
| image plane | ∞ | | | |

Aspheric Surface Data

17th surface

K = −8.75166e−001
A4 = 1.75023e−005
A6 = −1.02628e−008
A8 = −8.89143e−010
A10 = 7.90532e−012

22th surface

K = 3.43978e−001
A4 = −2.96730e−004
A6 = −5.98295e−006
A8 = 6.36801e−008
A10 = −2.77317e−009

23th surface

K = 1.54412e+000
A4 = 9.10712e−005
A6 = −5.62864e−006
A8 = 1.81095e−007
A10 = −3.72419e−009

Various Data
Zoom Ratio 39.10

| | Wide Angle | Middle | Telephoto |
|---|---|---|---|
| Focal Length | 3.93 | 38.53 | 153.51 |
| F-NUMBER | 1.65 | 3.00 | 4.90 |
| Half Angle of View (degs.) | 40.4 | 4.69 | 1.20 |
| Image Height | 3.20 | 3.20 | 3.20 |
| Lens Total Length | 87.41 | 87.41 | 87.41 |
| BF | 4.11 | 4.11 | 4.11 |
| d7 | 0.60 | 24.73 | 30.03 |
| d15 | 30.23 | 6.10 | 0.80 |
| d16 | 5.89 | 1.69 | 0.60 |
| d23 | 3.79 | 8.22 | 1.90 |
| d25 | 2.69 | 2.46 | 9.88 |

Zoom lens unit Data

| Unit | Start Surface | Focal Length |
|---|---|---|
| 1 | 1 | 42.56 |
| 2 | 8 | −6.38 |
| 3 | 17 | 14.18 |

-continued

[unit: mm]

| | | |
|---|---|---|
| 4 | 24 | −7.80 |
| 5 | 26 | 11.07 |

[Numerical Data 5]

[unit: mm]

Surface Data

| surface no. i | ri | di | ndi | νdi |
|---|---|---|---|---|
| 1 | 60.851 | 1.30 | 1.85478 | 24.8 |
| 2 | 37.270 | 4.94 | 1.49700 | 81.5 |
| 3 | 246.433 | 0.15 | | |
| 4 | 42.053 | 3.43 | 1.59522 | 67.7 |
| 5 | 136.112 | 0.10 | | |
| 6 | 32.187 | 3.51 | 1.59522 | 67.7 |
| 7 | 76.439 | (variable) | | |
| 8 | 87.603 | 0.60 | 1.95375 | 32.3 |
| 9 | 7.309 | 2.93 | | |
| 10 | 53.525 | 0.50 | 1.85150 | 40.8 |
| 11 | 13.375 | 2.14 | | |
| 12 | −20.387 | 0.50 | 1.77250 | 49.6 |
| 13 | 53.565 | 0.10 | | |
| 14 | 20.354 | 2.06 | 1.95906 | 17.5 |
| 15 | −57.827 | (variable) | | |
| 16(stop) | ∞ | (variable) | | |
| 17* | 10.947 | 3.82 | 1.76450 | 49.1 |
| 18 | 440.738 | 3.86 | | |
| 19 | 27.425 | 0.45 | 2.00100 | 29.1 |
| 20 | 6.521 | 2.91 | 1.43700 | 95.1 |
| 21 | 18.605 | 1.01 | | |
| 22* | 7.681 | 3.66 | 1.49700 | 81.5 |
| 23* | −12.855 | (variable) | | |
| 24 | −56.321 | 0.40 | 1.95375 | 32.3 |
| 25 | 7.732 | (variable) | | |
| 26 | 18.313 | 1.95 | 1.84666 | 23.9 |
| 27 | −17.525 | 2.28 | | |
| 28 | ∞ | 2.00 | 1.51633 | 64.1 |
| 29 | ∞ | 0.50 | | |
| image plane | ∞ | | | |

Aspheric Surface Data

17th surface

K = −1.10884e+000
A4 = 5.19322e−005
A6 = −1.23956e−007
A8 = 1.22160e−009
A10 = −1.19281e−011

22th surface

K = 4.04079e−001
A4 = −5.15700e−004
A6 = −7.28653e−006
A8 = 5.30036e−010
A10 = −5.65112e−009

23th surface

K = −7.86419e−001
A4 = 2.38274e−005
A6 = −3.52404e−006
A8 = 9.78293e−010
A10 = −1.11232e−009

Various Data
Zoom Ratio 43.99

| | Wide Angle | Middle | Telephoto |
|---|---|---|---|
| Focal Length | 3.97 | 43.52 | 174.78 |
| F-NUMBER | 1.65 | 3.00 | 4.90 |
| Half Angle of View (degs.) | 38.60 | 4.21 | 1.05 |

-continued

[unit: mm]

| | | | |
|---|---|---|---|
| Image Height | 3.20 | 3.20 | 3.20 |
| Lens Total Length | 88.40 | 88.40 | 88.40 |
| BF | 4.10 | 4.10 | 4.10 |
| d7 | 0.60 | 25.19 | 30.59 |
| d15 | 30.79 | 6.20 | 0.80 |
| d16 | 6.39 | 1.18 | 0.60 |
| d23 | 4.22 | 8.88 | 1.90 |
| d25 | 1.98 | 2.53 | 10.09 |

Zoom lens unit Data

| Unit | Start Surface | Focal Length |
|---|---|---|
| 1 | 1 | 43.83 |
| 2 | 8 | −6.39 |
| 3 | 17 | 14.14 |
| 4 | 24 | −7.11 |
| 5 | 26 | 10.85 |

TABLE 1

| | Embodiment | | | | |
|---|---|---|---|---|---|
| Variable | 1 | 2 | 3 | 4 | 5 |
| M2 | 30.60 | 32.52 | 29.57 | 29.43 | 29.99 |
| M3 | −4.88 | −4.94 | −4.90 | −5.29 | −5.79 |
| Mn | −4.68 | −4.51 | −9.41 | −7.19 | −8.12 |
| f1 | 43.99 | 46.42 | 43.23 | 42.56 | 43.83 |
| f2 | −5.99 | −5.92 | −6.90 | −6.38 | −6.39 |
| f3 | 13.86 | 13.44 | 13.43 | 14.18 | 14.14 |
| fn | −6.85 | −7.12 | −7.25 | −7.80 | −7.11 |
| βnT | 3.63 | 3.75 | 3.68 | 3.42 | 3.62 |
| βpT | 0.52 | 0.53 | 0.61 | 0.56 | 0.57 |
| ndn | 1.88 | 1.91 | 1.95 | 1.95 | 1.95 |
| ndp | 1.67 | 1.60 | 1.81 | 1.76 | 1.85 |
| drw | 34.57 | 35.49 | 32.02 | 36.00 | 35.43 |
| drt | 34.57 | 35.49 | 32.02 | 36.00 | 35.43 |
| dnpw | 6.04 | 7.15 | 4.36 | 4.43 | 4.23 |
| fw | 3.82 | 3.83 | 4.07 | 3.93 | 3.97 |
| ft | 149.39 | 168.13 | 159.31 | 153.51 | 174.78 |
| β3T | −0.45 | −0.43 | −0.05 | −0.24 | −0.21 |
| βnW | 2.97 | 3.14 | 2.40 | 2.51 | 2.49 |
| TD | 88.11 | 92.13 | 85.51 | 88.09 | 89.08 |
| fp | 10.64 | 11.53 | 11.80 | 11.07 | 10.85 |
| β2W | −0.182 | −0.169 | −0.223 | −0.201 | −0.199 |
| β2T | −5.07 | −5.22 | −35.20 | −7.63 | −8.94 |
| β3W | −0.372 | −0.345 | −0.356 | −0.309 | −0.304 |

TABLE 2

| Conditional Expression | Embodiment | | | | |
|---|---|---|---|---|---|
| | 1 | 2 | 3 | 4 | 5 |
| (1) | −0.20 | −0.18 | −0.23 | −0.22 | −0.21 |
| (2) | −1.46 | −1.58 | −0.77 | −1.09 | −0.88 |
| (3) | 1.22 | 1.20 | 1.53 | 1.36 | 1.45 |
| (4) | 1.13 | 1.09 | 1.08 | 1.22 | 1.18 |
| (5) | 0.17 | 0.20 | 0.14 | 0.15 | 0.12 |
| (6) | 6.43 | 6.52 | 5.97 | 5.46 | 6.17 |
| (7) | 0.88 | 0.83 | 0.95 | 0.82 | 0.90 |
| (8) | −3.3 | −3.6 | −4.7 | −3.4 | −4.0 |
| (9) | 1.88 | 1.91 | 1.95 | 1.95 | 1.95 |
| (10) | 1.7 | 1.6 | 1.8 | 1.8 | 1.8 |
| (11) | 3.17 | 3.45 | 3.22 | 3.00 | 3.10 |
| (12) | 2.84 | 2.72 | 2.74 | 2.68 | 2.44 |
| (13) | −1.57 | −1.55 | −1.69 | −1.62 | −1.61 |
| (14) | −0.05 | −0.04 | −0.05 | −0.05 | −0.04 |
| (15) | 4.13 | 4.03 | 3.66 | 3.85 | 4.04 |
| (16) | 0.56 | 0.51 | 0.58 | 0.58 | 0.59 |
| (17) | 1.79 | 1.86 | 1.78 | 1.99 | 1.79 |
| (18) | 0.07 | 0.07 | 0.07 | 0.07 | 0.06 |

TABLE 2-continued

| Conditional Expression | Embodiment | | | | |
|---|---|---|---|---|---|
| | 1 | 2 | 3 | 4 | 5 |
| (19) | 27.9 | 30.8 | 157.8 | 37.9 | 45.0 |
| (20) | 0.59 | 0.55 | 0.54 | 0.57 | 0.51 |
| (21) | 0.43 | 0.44 | 0.51 | 0.45 | 0.45 |
| (22) | 1.20 | 1.24 | 0.15 | 0.78 | 0.70 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-078727, filed Apr. 11, 2016, Japanese Patent Application No. 2016-078728, filed Apr. 11, 2016, and Japanese Patent Application No. 2016-078729, filed Apr. 11, 2016, which are hereby incorporated by reference herein in their entirety.

What is claimed is:

1. A zoom lens comprising, in order from an object side to an image side, a first lens unit having a positive refractive power, a second lens unit having a negative refractive power, an aperture stop, and a rear group including a plurality of lens units, wherein
intervals between the adjacent lens units are changed during zooming,
in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side,
the aperture stop does not move for zooming, but the second lens unit and the lens unit Ln move during zooming,
the first lens unit consists of, in order from the object side to the image side, a negative lens, a positive lens, a positive lens, and a positive lens, and
the zoom lens satisfies the following conditional expressions:

$-6.00 < f2/|M2| < -0.02$; and $-1.80 < fn/|Mn| < -0.02$, where f2 denotes a focal length of the second lens unit, fn denotes a focal length of the lens unit Ln, M2 denotes a movement amount of the second lens unit during zooming from a wide angle end to a telephoto end, and Mn denotes a movement amount of the lens unit Ln during zooming from the wide angle end to the telephoto end.

2. The zoom lens according to claim 1, wherein the zoom lens satisfies the following conditional expression:

$0.7 < f2/fn < 2.0$.

3. The zoom lens according to claim 1, wherein the zoom lens satisfies the following conditional expression:

$-5.0 < (1-\beta nT^2) \times \beta pT^2 < -2.0$, where $\beta nT$ denotes a lateral magnification of the lens unit Ln at the telephoto end, and $\beta pT$ denotes a lateral magnification of the lens unit Lp at the telephoto end.

4. The zoom lens according to claim 1, wherein
the lens unit Ln consists of a single negative lens, and the single negative lens satisfies the following conditional expression:

$1.7 < ndn < 2.1$, where ndn denotes a refractive power of a material for the single negative lens.

5. The zoom lens according to claim 1, wherein
the lens unit Lp consists of a single positive lens, and the single positive lens satisfies the following conditional expression:

$1.5 < ndp < 1.9$, where ndp denotes a refractive power of a material of the single positive lens.

6. The zoom lens according to claim 1, wherein the zoom lens satisfies the following conditional expression:

$2.5 < f1/f3 < 6.0$, where f1 denotes a focal length of the first lens unit, and f3 denotes a focal length of the third lens unit.

7. The zoom lens according to claim 1, wherein
the third lens unit satisfies the following conditional expression:

$1.2 < f3/|M3| < 4.0$, where f3 denotes a focal length of the third lens unit, and M3 denotes a movement amount of the third lens unit during zooming from the wide angle end to the telephoto end.

8. The zoom lens according to claim 1, wherein the third lens unit moves during zooming.

9. The zoom lens according to claim 1, wherein the second lens unit consists of, in order from the object side to the image side, a negative lens, positive lens, a negative lens, and a positive lens.

10. The zoom lens according to claim 1, wherein the second lens unit consists of, in order from the object side to the image side, a negative lens, a negative lens, a negative lens, and a positive lens.

11. The zoom lens according to claim 1, wherein the third lens unit consists of a positive lens.

12. The zoom lens according to claim 1, wherein the third lens unit consists of, in order from the object side to the image side, a positive lens, a negative lens, a positive lens, and a positive lens.

13. The zoom lens according to claim 1, wherein the rear group consists of, in order from the object side to the image side, the third lens unit, a fourth lens unit having a positive refractive power, a fifth lens unit having a negative refractive power, and a sixth lens unit having a positive refractive power.

14. The zoom lens according to claim 1, wherein the rear group consists of, in order from the object side to the image side, the third lens unit, a fourth lens unit having a negative refractive power, and a fifth lens unit having a positive refractive power.

15. A zoom lens comprising, in order from an object side to an image side, a first lens unit having a positive refractive power, a second lens unit having a negative refractive power, an aperture stop, and a rear group including a plurality of lens units,
wherein intervals between the adjacent lens units are changed during zooming,
in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side, the first lens unit does not move for zooming, but the second lens unit and the lens unit Ln move during zooming, the zoom lens satisfies the following conditional expressions:

$$1.10 < \beta nT/\beta nW < 1.70;$$

$$0.20 < drt/|M2| < 1.30; \text{ and}$$

$$0.01 < dnpw/drw < 0.40,$$

where βnW denotes a lateral magnification of the lens unit Ln at a wide angle end, βnT denotes the lateral magnification of the lens unit Ln at a telephoto end, M2 denotes a movement amount of the second lens unit during zooming from the wide angle end to the telephoto end, dnpw denotes a distance in an optical axis direction from the lens surface of the lens unit Ln closest to an object side to the lens surface of the lens unit Lp closest to the image side at the wide angle end, drw denotes a distance in the optical axis direction from the aperture stop to the image plane at the wide angle end, and drt denotes a distance in the optical axis direction from the aperture stop to the image plane at the telephoto end.

16. The zoom lens according to claim 15, wherein the zoom lens satisfies the following conditional expression:

$$-4.0 < f2/fw < -1.0,$$

where f2 denotes a focal length of the second lens unit, and fw denotes a focal length of the zoom lens at the wide angle end.

17. The zoom lens according to claim 15, wherein the zoom lens satisfies the following conditional expression:

$$-0.10 < fn/ft < -0.01,$$

where fn denotes a focal length of the lens unit Ln, and ft denotes a focal length of the zoom lens at the telephoto end.

18. A zoom lens comprising, in order from an object side to an image side, a first lens unit having a positive refractive power, a second lens unit having a negative refractive power, an aperture stop, and a rear group including a plurality of lens units, wherein intervals between the adjacent lens units are changed during zooming, in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side, the first lens unit does not move for zooming, but the second lens unit and the lens unit Ln move during zooming, the first lens unit includes a negative lens and two or more positive lenses, and the zoom lens satisfies the following conditional expressions:

$$4.5 < |f1/fn| < 10.0; \text{ and}$$

$$0.01 < dnpw/drw < 0.40,$$

where f1 denotes a focal length of the first lens unit, fn denotes a focal length of the lens unit Ln, dnpw denotes a distance in an optical axis direction from the lens surface of the lens unit Ln closest to an object side to the lens surface of the lens unit Lp closest to the image side at a wide angle end, and drw denotes a distance in the optical axis direction from the aperture stop to the image plane at the wide angle end.

19. The zoom lens according to claim 18, wherein the zoom lens satisfies the following conditional expressions:

$$2.0 < f1/fp < 8.0,$$

where fp denotes a focal length of the lens unit Lp.

20. The zoom lens according to claim 18, wherein the zoom lens satisfies the following conditional expression:

$$0.3 < |f2/fp| < 1.5,$$

where f2 denotes a focal length of the second lens unit, and fp denotes a focal length of the lens unit Lp.

21. The zoom lens according to claim 18, wherein the zoom lens satisfies the following conditional expression:

$$1.0 < |fn/fw| < 4.0,$$

where fw denotes a focal length of the zoom lens at the wide angle end.

22. The zoom lens according to claim 18, wherein the zoom lens satisfies the following conditional expression:

$$0.03 < fp/ft < 0.15,$$

where fp denotes a focal length of the lens unit Lp, and ft denotes a focal length of the zoom lens at the telephoto end.

23. The zoom lens according to claim 18, wherein the second lens unit satisfies the following conditional expression:

$$20.0 < \beta 2T/\beta 2W < 200.0,$$

where β2T denotes a lateral magnification of the second lens unit at the telephoto end, and β2W denotes the lateral magnification of the second lens unit at the wide angle end.

24. The zoom lens according to claim 18, wherein the zoom lens satisfies the following conditional expression:

$$0.40 < TD/ft < 0.80,$$

where TD denotes a total length of the zoom lens, and ft denotes a focal length of the zoom lens at the telephoto end.

25. The zoom lens according to claim 18, wherein the zoom lens satisfies the following conditional expression:

$$0.2 < |f2/f3| < 1.0,$$

where f2 denotes a focal length of the second lens unit, and f3 denotes a focal length of the third lens unit.

26. The zoom lens according to claim 18, wherein the zoom lens satisfies the following conditional expression:

$$0.10 < \beta 3T/\beta 3W < 2.00,$$

where β3W denotes a lateral magnification of the third lens unit at the wide angle end, and β3T denotes the lateral magnification of the third lens unit at the telephoto end.

27. An image pickup apparatus, comprising:
a zoom lens; and
an image pickup element configured to receive an image formed by the zoom lens,
the zoom lens comprising, in order from an object side to an image side: a first lens unit having a positive refractive power; a second lens unit having a negative refractive power; an aperture stop; and a rear group including a plurality of lens units,
wherein intervals between the adjacent lens units are changed during zooming,
in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side,
the aperture stop does not move for zooming, but the second lens unit and the lens unit Ln move during zooming,
the first lens unit consists of, in order from the object side to the image side, a negative lens, a positive lens, a positive lens, and a positive lens, and
the zoom lens satisfies the following conditional expressions:

$-6.00 < f2/|M2| < -0.02$; and $-1.80 < fn/|Mn| < -0.02$, where f2 denotes a focal length of the second lens unit, fn denotes a focal length of the lens unit Ln, M2 denotes a movement amount of the second lens unit during zooming from a wide angle end to a telephoto end, and Mn denotes a movement amount of the lens unit Ln during zooming from the wide angle end to the telephoto end.

28. An image pickup apparatus, comprising:
a zoom lens; and
an image pickup element configured to receive an image formed by the zoom lens,
the zoom lens comprising, in order from an object side to an image side: a first lens unit having a positive refractive power; a second lens unit of a negative refractive power; an aperture stop; and a rear group including a plurality of lens units,
wherein intervals between the adjacent lens units are changed during zooming,
in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side,
the first lens unit does not move for zooming, but the second lens unit and the lens unit Ln move during zooming, and
the zoom lens satisfies the following conditional expressions:

$1.10 < \beta nT/\beta nW < 1.70$;

$0.20 < drt/|M2| < 1.30$; and $0.01 < dnpw/drw < 0.40$, where βnW denotes a lateral magnification of the lens unit Ln at a wide angle end, βnT denotes the lateral magnification of the lens unit Ln at a telephoto end, M2 denotes a movement amount of the second lens unit during zooming from the wide angle end to the telephoto end, dnpw denotes a distance in an optical axis direction from the lens surface of the lens unit Ln closest to an object side to the lens surface of the lens unit Lp closest to the image side at the wide angle end, drw denotes a distance in the optical axis direction from the aperture stop to the image plane at the wide angle end, and drt denotes a distance in the optical axis direction from the aperture stop to the image plane at the telephoto end.

29. An image pickup apparatus, comprising:
a zoom lens; and
an image pickup element configured to receive an image formed by the zoom lens,
the zoom lens comprising, in order from an object side to an image side: a first lens unit having a positive refractive power; a second lens unit having a negative refractive power; an aperture stop; and a rear group including a plurality of lens units,
wherein intervals between the adjacent lens units are changed during zooming,
in the rear group, a lens unit Lp having a positive refractive power is arranged closest to an image side, a lens unit Ln having a negative refractive power is arranged on the object side of and adjacent to the lens unit Lp, and a third lens unit having a positive refractive power is arranged closest to the object side,
the first lens unit does not move for zooming, but the second lens unit and the lens unit Ln move during zooming,
the first lens unit includes a negative lens and two or more positive lenses, and
the zoom lens satisfies the following conditional expressions:

$4.5 < |f1/fn| < 10.0$; and $0.01 < dnpw/drw < 0.40$, where f1 denotes a focal length of the first lens unit, fn denotes a focal length of the lens unit Ln, dnpw denotes a distance in an optical axis direction from the lens surface of the lens unit Ln closest to an object side to the lens surface of the lens unit Lp closest to the image side at a wide angle end, and drw denotes a distance in the optical axis direction from the aperture stop to the image plane at the wide angle end.

* * * * *